United States Patent [19]
Chikuni et al.

[11] Patent Number: 5,755,867
[45] Date of Patent: May 26, 1998

[54] PHOTOCATALYTIC HYDROPHILIC COATING COMPOSITIONS

[75] Inventors: Makoto Chikuni; Makoto Hayakawa; Toshiya Watanabe, all of Kitakyushu; Masahiro Furuya, Gunma-ken; Masaaki Yamaya, Gunma-ken; Akira Yamamoto, Gunma-ken, all of Japan

[73] Assignees: Shin-Etsu Chemical Co., Ltd., Tokyo; Toto Ltd., Fukuoka-ken, both of Japan

[21] Appl. No.: 777,667

[22] Filed: Dec. 20, 1996

[30] Foreign Application Priority Data

Dec. 22, 1995 [JP] Japan ................ 7-349454
Dec. 22, 1995 [JP] Japan ................ 7-350273
Sep. 20, 1996 [JP] Japan ................ 8-271700

[51] Int. Cl.$^6$ ............... C09D 5/00; C09D 183/05; C09D 183/06; C09D 183/07
[52] U.S. Cl. ............... 106/287.16; 106/287.13; 106/287.14; 106/282.11; 106/282.12; 106/287.15
[58] Field of Search ............ 106/287.13, 287.14, 106/287.16, 287.11, 287.12, 287.15

[56] References Cited

PUBLICATIONS

CA 112:218784, Eckberg et al, "UV cure of epoxysiloxanes and epoxysilicones", 1990.
CA 112:140475, Eckberg, "UV–curable epoxy functional silicones", Sep. 27, 1989.

*Primary Examiner*—David Brunsman
*Attorney, Agent, or Firm*—Millen, White, Zelano & Branigan, P.C.

[57] ABSTRACT

A photocatalytic coating composition comprising (A) a coat-forming element capable of forming a coating of silicone resin when cured and (B) a photocatalyst dispersed therein. The coat-forming element is comprised of an organopolysiloxane having a monovalent organic $C_1$–$C_{18}$ group and a $C_1$–$C_4$ alkoxy group. The coating composition is applied to an article and cured to form a silicone coating thereon. When the coating is exposed to light, typically UV, the photocatalyst is excited to provide photocatalysis permitting organic groups attached to silicon atoms of silicone molecules at the coating surface to be replaced by hydroxyl groups in the presence of water, thereby rendering the coating surface hydrophilic. Thereafter, the coating maintains water affinity semi-eternally and has improved weather resistance.

19 Claims, 5 Drawing Sheets

PHOTOCATALYTIC HYDROPHILIC COATING COMPOSITIONS

BACKGROUND OF THE INVENTION

1. Field of the Invention

This invention relates to a coating composition capable of forming hydrophilic coatings. The coating composition of the invention may be applied to transparent articles such as glass, mirrors and lenses for anti-fogging purposes and to various articles to be exposed to an outdoor environment for anti-fouling and self-cleaning purposes and for facilitating cleaning of such articles although its application is not limited thereto.

2. Prior Art

Weather resistant coating compositions capable of curing into coatings of silicone (organopolysiloxane) and fluoro-resin were developed as paint for coating structures and buildings which are directly exposed to the outdoor environment. Coatings of silicone and fluoro-resin are advantageous in that they are little degraded by sunlight and fully resistant to weather.

Since silicone and fluoro-resin are highly water repellent and hydrophobic, it is generally believed in the prior art that coatings of silicone and fluoro-resin are also anti-fouling. However, foul coatings of silicone and fluoro-resin become more perceivable as the environment becomes more polluted. This suggests that hydrophobic coatings as such are unsatisfactory in anti-fouling. The reason why hydrophobic coatings are readily fouled is that urban smog is rich in lipophilic components comprising combustion products such as carbon and soot in exhausted gases and rather adheres to hydrophobic surfaces. It is thus recently believed desirable for anti-fouling purposes to render coating surfaces hydrophilic.

One technique for preventing coatings from being stained with lipophilic substances such as carbon and soot is a self-cleaning technique in which a water affinity-imparting material such as an alkyl silicate which is a precursor of silanol is added to a coating composition. An affinity for water is then imparted to a coating surface so that contaminants deposited on the coating surface may be swept away with rain water. Although this technique can temporarily prevent adsorption of contaminants, water affinity-imparting materials of this type are less resistant to water and themselves are also readily swept away with rain water. Then the self-cleaning effect does not last long.

Also in conjunction with automotive windshields, window panes, mirrors, eyeglass lens, masks, and helmet shields, anti-fogging compositions are used in the prior art for preventing such glass members from fogging and being clouded and for insuring visibility. Such anti-fogging compositions contain hydrophilic compounds such as polyethylene glycol and water-repellent compounds such as silicone fluid. These anti-fogging compositions are also temporary in that they are readily removed by water washing or contact with water and prematurely lose their effect.

SUMMARY OF THE INVENTION

Therefore, a primary object of the present invention is to provide a novel and improved coating composition capable of forming a coating exhibiting eternal or semi-eternal water affinity.

Another object of the present invention is to provide a novel and improved coating composition capable of forming a protective coating exhibiting semi-eternal water affinity, weather resistance, and durability.

A further object of the present invention is to provide a novel and improved coating composition capable of curing into a coating with improved properties and allowing the coating to be rendered hydrophilic.

A still further object of the present invention is to provide a novel and improved coating composition capable of forming a coating exhibiting a high degree of water affinity.

A still further object of the present invention is to provide a novel and improved coating composition capable of forming a semi-eternal anti-fogging coating.

A still further object of the present invention is to provide a novel and improved coating composition capable of forming a coating which retains anti-fouling or self-cleaning effect semi-eternally.

A still further object of the present invention is to provide a novel and improved coating composition which can be readily applied to a surface of an article to form a coating having durability, mar resistance and water affinity.

In a first form, the invention provides a photocatalytic hydrophilic coating composition comprising (A) a coat-forming element comprising an organopolysiloxane of the average compositional formula:

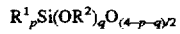

wherein $R^1$ is independently a hydrogen atom or a monovalent organic group having 1 to 18 carbon atoms, $R^2$ is independently a hydrogen atom or a monovalent organic group having 1 to 4 carbon atoms, and letters p and q are numbers in the range: $0.7 \leq p \leq 1.6$, $0 < q < 3.3$, and $0.7 < p+q < 4$, the coat-forming element capable of forming a coating of silicone resin when cured, and (B) a particulate photocatalyst dispersed in the coat-forming element which exerts photocatalysis upon photo excitation such that at least some of organic groups attached to silicon atoms of silicone molecules at the surface of the coating are replaced by hydroxyl groups in the presence of water, thereby rendering the coating surface hydrophilic.

In one preferred embodiment, the organopolysiloxane is obtained by at least partially hydrolyzing a mixture consisting essentially of (a) 0 to 60 mol % of a silane of the general formula: $R^1{}_2SiX_2$ wherein $R^1$ is as defined above and X is chlorine, bromine or an alkoxy group having 1 to 4 carbon atoms, (b) 10 to 100 mol % of a silane of the general formula: $R^1SiX_3$ wherein $R^1$ and X are as defined above, and (c) 0 to 30 mol % of a silane of the general formula: $SiX_4$ wherein X is as defined above, followed by polycondensation.

In a second form, the invention provides a photocatalytic hydrophilic coating composition comprising (a) 0 to 60 mol % of a silane of the general formula: $R^1{}_2SiX_2$ wherein $R^1$ is independently a hydrogen atom or a monovalent organic group having 1 to 18 carbon atoms and X is chlorine, bromine or an alkoxy group having 1 to 4 carbon atoms, (b) 10 to 100 mol % of a silane of the general formula: $R^1SiX_3$ wherein $R^1$ and X are as defined above, (c) 0 to 30 mol % of a silane of the general formula: $SiX_4$ wherein X is as defined above, and (d) a particulate photocatalyst, wherein the composition, when applied to a substrate, forms a coating of silicone resin through hydrolysis of the silanes in the presence of water and dehydrating polycondensation, and the photocatalyst exerts photocatalysis upon photo excitation such that at least some of organic groups attached to silicon atoms of silicone molecules at the surface of the coating are replaced by hydroxyl groups in the presence of water, thereby rendering the coating surface hydrophilic.

In a third form, the invention provides a photocatalytic hydrophilic coating composition of the two part type comprising (A) a first liquid part having dispersed in a dispersing medium an organopolysiloxane of the average compositional formula:

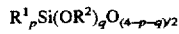
$$R^1_p Si(OR^2)_q O_{(4-p-q)/2}$$

wherein $R^1$ is independently a hydrogen atom or a monovalent organic group having 1 to 18 carbon atoms, $R^2$ is independently a hydrogen atom or a monovalent organic group having 1 to 4 carbon atoms, and letters p and q are numbers in the range: $0.7 \leq p \leq 1.6$, $0 < q < 3.3$, and $0.7 < p+q < 4$, the first liquid part capable of forming a coating of silicone resin when cured in the presence of water, and (B) a second liquid part having dispersed in an aqueous dispersing medium a particulate photocatalyst which exerts photocatalysis upon photo excitation such that at least some of organic groups attached to silicon atoms of silicone molecules at the surface of the coating are replaced by hydroxyl groups in the presence of water, thereby rendering the coating surface hydrophilic.

In a fourth form, the invention provides a photocatalytic hydrophilic coating composition of the two part type comprising (A) a first liquid part having dispersed in a non-aqueous dispersing medium (a) 0 to 60 mol % of a silane of the general formula: $R^1_2 SiX_2$ wherein $R^1$ is independently a hydrogen atom or a monovalent organic group having 1 to 18 carbon atoms and X is chlorine, bromine or an alkoxy group having 1 to 4 carbon atoms, (b) 10 to 100 mol % of a silane of the general formula: $R^1 SiX_3$ wherein $R^1$ and X are as defined above, and (c) 0 to 30 mol % of a silane of the general formula: $SiX_4$ wherein X is as defined above, the first liquid part capable of forming a coating of silicone resin when cured in the presence of water, and (B) a second liquid part having dispersed in an aqueous dispersing medium a particulate photocatalyst which exerts photocatalysis upon photo excitation such that at least some of an organic groups attached to silicon atoms of silicone molecules at the surface of the coating are replaced by hydroxyl groups in the presence of water, thereby rendering the coating surface hydrophilic.

In one aspect, the invention provides a coating composition which cures and converts into a hydrophilic coating. This coating composition contains (A) a coat-forming element comprising a silicone precursor which forms a coating of silicone or organopolysiloxane when cured and (B) a particulate photocatalyst uniformly dispersed in the coat-forming element for modifying a surface of the silicone coating upon photo excitation for rendering the coating surface hydrophilic.

The coating composition is applied to an article and cured to form a silicone coating. When light is irradiated to the coating to cause photo excitation of the photocatalyst, at least some of an organic groups attached to silicon atoms of silicone molecules at the surface of the coating are replaced by hydroxyl groups in the presence of water under the impetus of photocatalysis, thereby rendering the coating surface hydrophilic. This phenomenon is confirmed by infrared (IR) spectroscopy and Raman spectroscopy as will be described later.

When organic groups attached to silicon atoms of silicone molecules at the coating surface are replaced by hydroxyl groups in response to photo excitation of the photocatalyst, the surface of the silicone coating is given a high degree of water affinity. This is probably because moisture in the air is adsorbed to the hydroxyl groups newly formed at the coating surface, forming a stratum of adsorbed water on the coating surface.

Once the surface of the silicone coating is rendered hydrophilic, that surface's water affinity lasts for a certain period of time even after photo excitation is interrupted. If the coating surface gradually loses water affinity with the lapse of time, water affinity can be restored by inducing photo excitation again. When the photocatalyst is subject to photo excitation by sunlight, for example, the coating retains water affinity at night. Then, by simply relying on exposure to sunlight in the daytime, the coating surface can be maintained hydrophilic semi-eternally. Alternatively, once the surface of the silicone coating is rendered hydrophilic, that surface's water affinity can be maintained or restored by irradiating relatively weak light. Therefore, even in the case of photocatalysts requiring ultraviolet radiation for photo excitation such as titania, maintenance and restoration of water affinity can be satisfactorily done with very weak ultraviolet radiation available in illuminating light of common interior luminaires such as fluorescent lamps.

Photo excitation of the photocatalyst is preferably done such that the surface of the silicone coating may have a contact angle with water of less than about 60°, more preferably less than about 30°, most preferably less than about 10°. For anti-fouling or self-cleaning coatings, the objects are achieved by imparting water affinity to such an extent that the contact angle of the coating surface with water may be less than about 60°. For anti-fogging coatings, water affinity is preferably imparted to such a greater extent that the contact angle of the coating surface with water may be less than about 10°.

The coating composition of the invention is easily applicable to any article by conventional coating techniques, forming a silicone coating having improved mar resistance. Since those groups that are replaced by hydroxyl groups under the impetus of photocatalysis are only replaceable organic groups attached to silicon atoms of silicone molecules at the coating surface, siloxane linkages (—Si—O—Si—) of silicone molecules forming a crosslinking skeleton are not affected at all. Therefore, the silicone coating itself is not degraded upon outdoor exposure, that is, has improved weather resistance.

Accordingly, in the practice of the invention, after the coating composition is applied to a surface of a substrate and cured to form a coating of silicone resin on the substrate, the photocatalyst is subject to photo excitation whereby organic groups attached to silicon atoms of silicone molecules at the coating surface are at least partially replaced by hydroxyl groups in the presence of water ($H_2O$) so that the contact angle of the coating surface with water may be less than about 60°, thereby rendering the coating surface hydrophilic.

The coating whose surface is rendered hydrophilic in response to photo excitation as mentioned above permits condensed water of moisture and/or water droplets depositing on the coating surface to spread over the coating surface. In this way, the silicone resin coating on the substrate prevents the substrate from being fogged or clouded by condensed water of moisture and/or water droplets. Also, when rain drops on the coated substrate, deposits and/or contaminants sticking to the coated substrate are washed away with rain water, providing for self-cleaning of the surface. Moreover, contaminated rain water contacts the coated substrate, the silicone resin coating prevents contaminants from sticking to the surface. Similarly, when the coated substrate is immersed in water or wetted with water, any deposit and/or contaminant sticking to the coated surface is released. The step of washing a foul surface with water to remove foul matter is very easy.

DESCRIPTION OF THE PREFERRED EMBODIMENTS

Figure 1A:
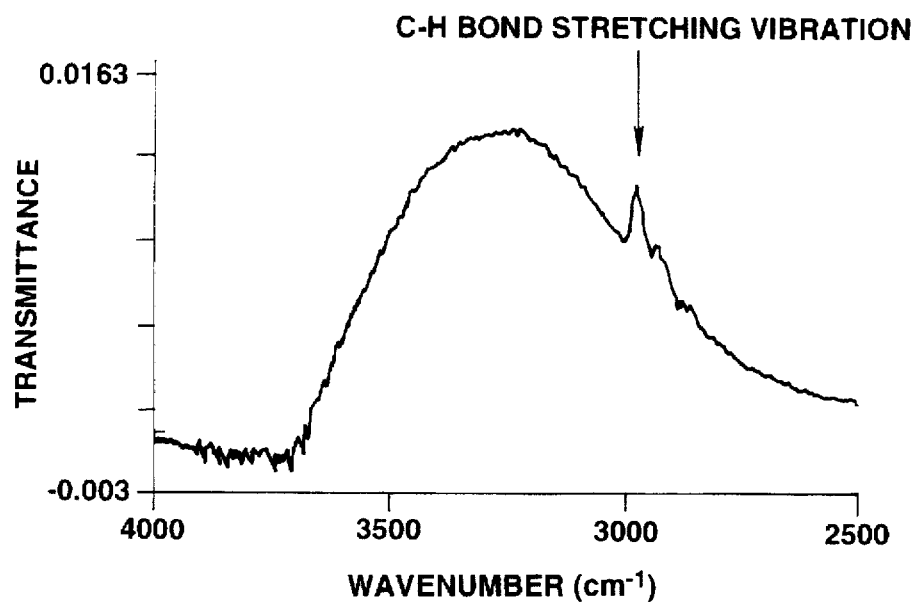
FIGS. 1(a) and 1(b) show IR spectra of a sample of Example 1 before and after UV exposure.

Briefly stated, the photocatalytic hydrophilic coating composition according to the invention is defined as comprising (A) a coat-forming element and (B) a particulate photocatalyst dispersed therein.

The coat-forming element (A) capable of forming a coating of silicone resin when cured is comprised of an organopolysiloxane of the average compositional formula (1):

$$R^1_p Si(OR^2)_q O_{(4-p-q)/2} \quad (1)$$

wherein $R^1$, which may be the same or different, is a hydrogen atom or a monovalent organic group having 1 to 18 carbon atoms, $R^2$, which may be the same or different, is a hydrogen atom or a monovalent organic group having 1 to 4 carbon atoms, and letters p and q are numbers in the range: $0.7 \leq p \leq 1.6$, $0 < q < 3.3$, and $0.7 < p+q < 4$.

The organic groups represented by $R^1$ include unsubstituted monovalent hydrocarbon groups, for example, alkyl, cycloalkyl, alkenyl, aryl, and aralkyl groups, and substituted monovalent hydrocarbon groups wherein some or all of hydrogen atoms are replaced by functional groups, for example, halogen atoms (e.g., fluorine), epoxy-containing groups (e.g., glycidoxy and epoxycyclohexyl groups), (meth)acryloxy groups, amino groups, and mercapto groups. $R^1$ may be one of these groups or a mixture of two or more groups. For the purpose of imparting affinity to water, it is preferred that $R^1$ contain at least one organic group having at least 3 carbon atoms, more preferably 3 to 18 carbon atoms, most preferably 3 to 6 carbon atoms, typically alkyl, cycloalkyl, alkenyl and aryl groups. More preferably, an organic group having at least 3 carbon atoms is contained such that p may have a value of 0.1 to 1.0 ($0.1 \leq p \leq 1.0$), especially 0.3 to 0.8 ($0.3 \leq p \leq 0.8$). While p ranges from 0.7 to 1.6, it is preferred that a fraction of p ranging from 0.1 to 1.0 be an organic group having at least 3 carbon atoms.

The organic groups having 1 to 4 carbon atoms represented by $R^2$ include alkyl groups such as methyl, ethyl, and propyl.

Letter q is $0 < q < 3.3$, preferably $0.1 \leq q \leq 0.8$. With $q \geq 3.3$, greater volume shrinkage occurs upon curing to induce cracks in the coating. The sum of p and q is $0.7 < p+q < 4$, preferably $1 < p+q < 2$.

The organopolysiloxane is formed by partial hydrolysis of hydrolyzable silanes followed by polycondensation. Illustratively, the organopolysiloxane can be formed from a mixture of: (a) 0 to 60 mol % of a silane of the general formula: $R^1_2 SiX_2$, (b) 10 to 100 mol % of a silane of the general formula: $R^1 SiX_3$, and (c) 0 to 30 mol % of a silane of the general formula: $SiX_4$ wherein $R^1$ is a hydrogen atom or a monovalent organic group having 1 to 18 carbon atoms as defined in formula (1) and X is chlorine, bromine or an alkoxy group having 1 to 4 carbon atoms.

The trifunctional silane in which three hydrolyzable groups (e.g., chloro, bromo or alkoxy) represented by X are contained per molecule and each silicon atom forms siloxane bonds with three oxygen atoms is an important component in forming a silicone coating. For satisfactory hardness and outer appearance (such as flatness) of coatings and ease of formation, it is essential that the monomer mixture contain at least 10 mol % of the trifunctional silane. Preferably the monomer mixture contains 30 to 80 mol % of the trifunctional silane.

In order to impart flexibility to the coating, the monomer mixture preferably contains the difunctional silane in which two hydrolyzable groups represented by X are contained per molecule and each silicon atom forms siloxane bonds with two oxygen atoms. In order to obtain a cured coating having an increased crosslinking density and satisfactory hardness, the content of the difunctional silane should be up to 60 mol %. Preferably 1 to 40 mol % of the difunctional silane is used.

In order to increase the hardness of coatings, the monomer mixture preferably contains the tetrafunctional silane in which four hydrolyzable groups represented by X are contained per molecule and each silicon atom forms siloxane bonds with four oxygen atoms. If the content of tetrafunctional silane is too large, greater volume shrinkage would occur upon curing to induce cracks in the coating. Thus the monomer mixture should contain up to 30 mol %, preferably up to 20 mol % of the tetrafunctional silane for preventing crack occurrence.

The molecular weight of organopolysiloxane has some influence on the rate of rendering the coating hydrophilic. Relatively low molecular weight ones are more effective for imparting water affinity whereas relatively high molecular weight ones tend to form coatings having transparency, luster and smoothness. From these considerations, the organopolysiloxane preferably has a number average molecular weight of about 80 to 20,000 as measured by gel permeation chromatography (GPC) using polystyrene as a standard.

Examples of the hydrolyzable trifunctional silane include methyltrichlorosilane, methyltribromosilane, methyltrimethoxysilane, methyltriethoxysilane, methyltriisopropoxysilane, methyltri-t-butoxysilane, ethyltrichlorosilane, ethyltribromosilane, ethyltrimethoxysilane, ethyltriethoxysilane, ethyltriisopropoxysilane, vinyltrichlorosilane, vinyltribromosilane, vinyltrimethoxysilane, vinyltriethoxysilane, trichlorohydrosilane, tribromohydrosilane, trimethoxyhydrosilane, and triethoxyhydrosilane.

Examples of the hydrolyzable difunctional silane include dimethyldichlorosilane, dimethyldibromosilane, dimethyldimethoxysilane, and dimethyldiethoxysilane.

Examples of the hydrolyzable tetrafunctional silane include tetrachlorosilane, tetrabromosilane, tetramethoxysilane, tetraethoxysilane, tetrabutoxysilane, and dimethoxydiethoxysilane.

As mentioned above, the hydrolyzable silanes or uncured organopolysiloxanes resulting from partial hydrolysis and polycondensation thereof should preferably contain an organic group having at least 3 carbon atoms, especially 3 to 6 carbon atoms. This is because when organic groups attached to silicon atoms of silicone molecules at the surface of a silicone coating are replaced by hydroxyl groups under the impetus of photocatalysis, organic groups having at least 3 carbon atoms are more easily replaced by hydroxyl groups than are organic groups having less than 3 carbon atoms so that the silicone coating may acquire water affinity within a shorter time or with a lower dose of light.

Preferred examples of the hydrolyzable trifunctional silane having an organic group of at least 3 carbon atoms include n-propyltrichlorosilane, n-propyltribromosilane, n-propyltrimethoxysilane, n-propyltriethoxysilane, n-propyltriisopropoxysilane, n-hexyltrichlorosilane, n-hexyltribromosilane, n-hexyltrimethoxysilane, n-hexyltriethoxysilane, n-decyltrimethoxysilane, n-decyltriethoxysilane, n-octadecyltrimethoxysilane, n-octadecyltriethoxysilane, phenyltrichlorosilane, phenyltribromosilane, phenyltrimethoxysilane, phenyltriethoxysilane, γ-glycidoxypropyltrimethoxysilane, γ-glycidoxypropyltriethoxysilane, β-(3,4-epoxycyclohexyl) ethyltrimethoxysilane, β-(3,4-epoxycyclohexyl) ethyltriethoxysilane, γ-(meth) acryloxypropyltrimethoxysilane, γ-(meth) acryloxypropyltriethoxysilane, γ-aminopropyltrimethoxysilane, γ-aminopropyltriethoxysilane, γ-mercaptopropyltrimethoxysilane, γ-mercaptopropyltriethoxysilane, trifluoropropyltrichlorosilane, trifluoropropyltribromosilane, trifluoropropyltrimethoxysilane, trifluoropropyltriethoxysilane, heptadecafluorooctyltrimethoxysilane, and heptadecafluorooctyltriethoxysilane.

Preferred examples of the hydrolyzable difunctional silane having an organic group of at least 3 carbon atoms include diphenyldichlorosilane, diphenyldibromosilane, diphenyldimethoxysilane, diphenyldiethoxysilane, phenylmethyldichlorosilane, phenylmethyldibromosilane, phenylmethyldimethoxysilane, phenylmethyldiethoxysilane, γ-glycidoxypropylmethyldimethoxysilane, γ-glycidoxypropylmethyldiethoxysilane, γ-(meth) acryloxypropylmethyldimethoxysilane, γ-(meth) acryloxypropylmethyldiethoxysilane, γ-aminopropylmethyldimethoxysilane, γ-aminopropylmethyldiethoxysilane, heptadecafluorooctylmethyldimethoxysilane, and heptadecafluorooctylmethyldiethoxysilane.

Preferred from the standpoints of availability and ease of handling are dimethyldimethoxysilane, dimethyldiethoxysilane, methyltrimethoxysilane, methyltriethoxysilane, tetramethoxysilane, tetraethoxysilane, n-propyltrimethoxysilane, n-propyltriethoxysilane, γ-glycidoxypropyltrimethoxysilane, γ-glycidoxypropyltriethoxysilane, γ-glycidoxypropylmethyldimethoxysilane, and γ-glycidoxypropylmethyldiethoxysilane.

In particular, liquid coating compositions prepared from silanes having a γ-glycidoxypropyl group are shelf stable. Although the content of γ-glycidoxypropyl group is not critical, liquid coating compositions wherein the organopolysiloxane contains about 5 to 40 mol % of γ-glycidoxypropyl group based on the entire organic groups therein are shelf stable and form coatings of better hardness and transparency.

In another embodiment of the invention, the coat-forming element of the coating composition comprises (a) 0 to 60 mol %, preferably 1 to 40 mol % of a silane of the general formula: $R^1{}_2SiX_2$, (b) 10 to 100 mol %, preferably 30 to 80 mol % of a silane of the general formula: $R^1SiX_3$, and (c) 0 to 30 mol %, preferably 0 to 20 mol % of a silane of the general formula: $SiX_4$ wherein $R^1$ is independently a hydrogen atom or a monovalent organic group having 1 to 18 carbon atoms, preferably 3 to 18 carbon atoms, more preferably 3 to 6 carbon atoms and X is chlorine, bromine or an alkoxy group having 1 to 4 carbon atoms.

When this coating composition with or without water added is applied to a substrate, the silanes are subject to hydrolysis in the presence of water added or moisture in the air, whereby hydrolyzable groups X (chloro, bromo or alkoxy) are converted into hydroxyl groups and hydrolyzates undergo dehydration polycondensation to form a coating of silicone resin. When light is irradiated to the silicone coating to photo excite the photocatalyst, photocatalysis occurs permitting organic groups attached to silicon atoms of silicone molecules at the coating surface to be replaced by hydroxyl groups as previously mentioned, thereby rendering the coating surface hydrophilic.

The coating composition of the invention may be prepared as a one-part type coating composition in which hydrolyzable silanes (or organopolysiloxane resulting from partial hydrolysis and polycondensation of hydrolyzable silanes) and photocatalytic particles are dispersed in a solvent. On use, water may be added to the coating composition before it is applied. Alternatively, without addition of water, the coating composition may be allowed to cure in the presence of moisture in the ambient air. In the latter case, a UV curing agent may be added to the coating composition.

In a further embodiment, the coating composition of the invention is prepared as a two-part type coating composition whereby the two parts can be shelf stored. The coating composition comprises a first liquid part having hydrolyzable silanes (or organopolysiloxane resulting from partial hydrolysis and polycondensation of hydrolyzable silanes) dispersed in a non-aqueous solvent and a second liquid part having photocatalytic particles dispersed in an aqueous solvent. On use, the two parts are mixed to form a uniform mixture before the mixture is applied.

Of course, it is possible to formulate a three part type coating composition comprising (1) a coat-forming element, (2) photocatalytic particles, and (3) a curing catalyst and other components.

To the coating composition of the invention, any of prior art well-known hydrolysis catalysts may be added. Preferred are hydrolysis catalysts which exhibit acidity of the order of pH 2 to 5 upon contact with water. Especially preferred are acidic hydrogen halides, carboxylic acids, sulfonic acid, acidic or weakly acidic inorganic salts, and solid acids such as ion exchange resins. Preferred examples include hydrofluoric acid, hydrochloric acid, nitric acid, and sulfuric acid; organic acids such as acetic acid and maleic acid; methylsulfonic acid; and cation exchange resins having a sulfonate or carboxylate group at the surface. The hydrolysis catalyst is preferably added in an amount of 0.001 to 5 mol per mol of the hydrolyzable group on silicon atom.

The amount of water used for hydrolysis is preferably 0.001 to 500 mol, more preferably 0.05 to 100 mol per mol of the hydrolyzable group on silicon atom when the curability of a coating and the stability of coating liquid are taken into account.

Hydrolysis reaction is preferably carried out in the co-presence of polar solvents such as alcohols, ketones and esters or non-polar solvents such as toluene and hexane. Where a halogenosilane is used as a raw material, the hydrolyzed product must be fully washed with water to remove the halogen components.

As the solvent or dispersing medium for the coating composition, polar organic solvents are useful. When the stability of sol and availability are taken into account, it is preferred to use lower alcohols such as methanol, ethanol, isopropyl alcohol, n-butanol, and isobutanol and ketones such as methyl ethyl ketone (MEK) and methyl isobutyl ketone (MIBK) as well as water. As the diluent for diluting the coating composition, water and any organic solvents are useful. Preferred organic solvents are alcohols, ketones, esters, and ethers.

To the coating composition of the invention, any of prior art well-known curing catalysts may be added. Exemplary curing catalysts include basic compounds such as lithium hydroxide, sodium hydroxide, potassium hydroxide, sodium methylate, sodium acetate, sodium formate, potassium acetate, potassium formate, potassium propionate, tetramethylammonium chloride, and tetramethylammonium hydroxide; amines such as n-hexylamine, tributylamine, diazabicycloundecene, ethylenediamine, hexanediamine, diethylenetriamine, triethylenetetramine, tetraethylenepentamine, ethanolamine, γ-aminopropyltrimethoxysilane, γ-(2-aminoethyl)-aminopropyltrimethoxysilane, γ-aminopropylmethyldimethoxysilane, and γ-(2-aminoethyl)-aminopropylmethyldimethoxysilane; titanium compounds such as tetraisopropyl titanate and tetrabutyl titanate; aluminum compounds such as aluminum triisobutoxide, aluminum triisopropoxide, aluminum acetylacetonate, aluminum perchlorate, and aluminum chloride; tin compounds such as tin acetylacetonate and dibutyltin octylate; metal-containing compounds such as cobalt octylate, cobalt acetylacetonate, and iron acetylacetonate; and acidic compounds such as phosphoric acid, nitric acid, phthalic acid, p-toluenesulfonic acid, and trichloroacetic acid.

For pH adjustment, a buffer agent may be added to the coating composition. Useful are combinations of acidic and basic compounds, for example, acetic acid and sodium acetate, and disodium hydrogen phosphate and citric acid. Additionally, pigments, dyes, leveling agents, and storage stabilizers may be added for the purpose of improving coating properties.

For improving the stability of coating liquid, there may be added well-known surfactants, titanate coupling agents, and silane coupling agents.

Also, microparticulate metal oxides may be added for improving the hardness and mar resistance of a cured coating and imparting optical functions such as a high index of refraction. Exemplary metal oxides are silica, alumina, cerium oxide, zirconium oxide, antimony oxide, and rare earth oxides. Silica is preferably added to improve mar resistance.

A photocatalyst is used in the photocatalytic coating composition of the invention. Titania or titanium dioxide is the most preferred photocatalyst. Titania is harmless, chemically stable and available at low cost. Because of high band gap energy, titania offers the additional advantage that it does not cause complementary color components to develop color since it requires UV radiation for photo excitation and does not absorb visible light in the process of photo excitation. Then the composition is suitable to form antifogging coats on glass, mirror, and lens. The photocatalytic titania used herein may be either anatase or rutile type titania. Titania increases photocatalytic activity as the mean particle size of its particles is smaller. It is thus recommended to use titania particles having a mean particle size of 0.1 μm or less. There are commercially available a nitric acid peptization type titania sol and an ammonia peptization type titania sol, each of which is a sol having anatase type titania particles with a fully small mean particle size dispersed in aqueous nitric acid or aqueous ammonia. The dispersing medium for sol is preferably selected from alcohols such as methanol, ethanol, isopropanol, n-butanol, and isobutanol, and ketones such as methyl ethyl ketone and methyl isobutyl ketone as well as water. Titania particles may be used in the form of powder or a paste containing titania particles in water or solvent may also be used as the titania particle source.

Photocatalysts other than titania may be used insofar as they have high photocatalytic activity. Included are semiconductor photocatalysts of metal oxides such as tin oxide, zinc oxide, ferric oxide, tungsten trioxide, dibismuth trioxide, and strontium titanate.

The amount of the photocatalyst added to the coating composition may be properly determined without undue experimentation although it is preferably 10 to 400 parts, especially 20 to 300 parts by weight per 100 parts by weight of the coat-forming element.

It is noted that the particulate photocatalyst (typically titania) is a particulate substance (titania) or its aggregate consisting of unit lattices having continuous periodicity of such an order as to have sufficient nature to create electrons and holes upon exposure to photons having greater energy than the forbidden bandwidth. Its crystallographic system may be any of anatase, rutile, and buchite types. Insofar as titania possesses the above-mentioned nature, a metal other than titanium may be in contact with or form a solid solution with titania. The continuous periodicity of such an order as to have sufficient nature to create electrons and holes is at least such that a highest peak of crystal is observable upon powder X-ray diffractometry under conditions of 50 kV and 300 mA.

The particulate photocatalyst is obtained by well-known techniques as disclosed in JP-A 171408/1995, for example, by subjecting titanium compounds such as titanyl sulfate, titanyl chloride and titanium alkoxides to thermal hydrolysis, neutralization by alkali addition, gas phase oxidation, and firing or hydrothermal treatment.

After a photocatalyzed coating composition is applied and cured to form a photocatalyzed silicone coating, various light sources may be used for irradiating light to the silicone coating to photo excite the photocatalyst for rendering the silicone coating hydrophilic. For example, anatase type titania can be photo excited with UV radiation of a wavelength of less than 387 nm. Similarly, rutile type titania, tin oxide and zinc oxide can be photo excited with UV radiation of a wavelength of less than 413 nm, less than 344 nm, and less than 387 nm, respectively. Then the UV source for photo exciting such photocatalysts includes lamps having high UV illuminance such as UV lamps (or bactericidal lamps), metal halide lamps, and mercury lamps. Room lighting lamps such as fluorescent lamps and incandescent lamps are also useful.

Particularly when articles to be coated are exposed to sunlight as are buildings, vehicles, and window grazing, it is convenient and advantageous to photo excite the photocatalyst utilizing UV radiation contained in sunlight.

Photo excitation is continued until the silicone coating is given a desired degree of water affinity for a particular application. Usually, upon photo excitation at a UV illuminance of 0.001 mW/cm$^2$, it takes a few days to impart such water affinity as to provide a contact angle with water of about 10° or less. Since sunlight reaching the ground contains UV radiation with an illuminance of about 0.1 to 1 mW/cm$^2$, the coating surface can be rendered hydrophilic within several hours by exposure to sunlight.

As previously mentioned, once the surface of silicone coating acquires water affinity, the coating maintains water affinity for a certain time. Where the photocatalyst is photo excited with sunlight, water affinity is retained overnight with a slight decline and recovered whenever the coating is exposed to sunlight. In this way, water affinity is maintained semi-eternally.

To the coating composition of the invention, there may be added antibacterial enhancers such as silver, copper, zinc or compounds thereof (e.g., soluble salts), and optical activity enhancers such as platinum, gold, palladium, iron, nickel or soluble salts thereof. In addition to its function of imparting water affinity to silicone coatings, the photocatalyst exerts photocatalytic redox action, insofar as it is being photo excited, for destroying bacteria in contact with the catalyst, suppressing growth of microorganisms and degrading contaminants. The addition of silver, copper or zinc insures antibacterial and deodorant actions in a dark duration. Then the surface of a coated article is maintained clean over an extended period of time. The addition of platinum, gold, palladium, iron or nickel enhances the redox activity of the photocatalyst, promoting decomposition of contaminants adhering to the coating surface. The antibacterial enhancer may be added in an amount of 20% by weight or less, preferably 0.1 to 20% by weight per 100 parts by weight of the photocatalyst. If the antibacterial enhancer is added in an amount of more than 20% by weight, the hydrophilic nature of the resulting coating may be hindered upon exposure and the transparency and appearance of the coating may be lowered.

In a still further aspect, the invention provides a method for forming a hydrophilic coating using the coating composition defined above. The coating composition of the invention is applied to substrates of plastics, ceramics, glass, metals, composite materials thereof or other materials. The technique of applying the coating composition to substrates may be any desired one of conventional techniques such as spray coating, roll coating, dipping, and spin coating. The thickness of a coating is not critical although it is preferably 0.01 to 50 µm, more preferably 0.05 to 10 µm.

Thereafter, the coating is cured to form a silicone coating on the substrate. Curing may be done by allowing the coating to stand in air, that is, air drying, although it is preferred to heat the coating at a temperature of above 25° C. to 250° C. for about 10 minutes to 2 hours. The thus cured coating is exposed to light to photo excite the photocatalyst until the surface of the silicone coating acquires a desired degree of water affinity.

In one embodiment, the hydrophilic coat forming method is applicable to various substrates required to be antifogging. More particularly, photocatalyzed silicone coatings are formed on substrates or supports required to be antifogging, for example, window glazing in buildings, windshields and rear view mirrors in automobiles and other vehicles, various mirrors, lenses of eyeglasses and other optical instruments, protective and sports goggles, masks, helmet shields, glass slides of frozen food display containers, and glass covers of meters. Photo excitation of the photocatalyst is preferably continued until the silicone coating on the surface acquires water affinity as represented by a contact angle with water of less than about 30°, more preferably less than about 20°, most preferably less than about 10°.

Once the surface of silicone coating is rendered hydrophilic in this way, when moisture and steam in the air condenses on the coating surface, the condensed water does not form water droplets, but a uniform water film so that the surface is free of light scattering fog. Similarly, when rain and water splashes land on window panes, vehicle rear view mirrors, vehicle windshields, eyeglass lenses, and helmet shields, water droplets spread to form a uniform water film as soon as they come in contact with the surface. There are formed no discrete water droplets obstructive to a view and the article is not clouded at all. This offers a clear field of view and visibility and insures safety to vehicles and traffic, contributing to improvements in efficiency of various operations and activities. The antifogging effect lasts permanently insofar as photo excitation is repeated at intervals.

In another embodiment of the invention, the hydrophilic coat forming method is applicable to substrates to be self cleaned, for example, buildings, structures, machines and articles located outdoor. When an article covered with a photocatalyzed silicone coating is installed outdoor, the photocatalyst is subject to photo excitation upon exposure to sunlight in the daytime whereby the surface of silicone coating is rendered hydrophilic. The silicone coating is sometimes exposed to rain. The hydrophilic surface has affinity to water rather than hydrophobic fumes and contaminants, and hydrophobic fumes and contaminants are liberated from the coating surface by water. Whenever the hydrophilic surface is exposed to rain, fumes and contaminants which have stuck to the surface are washed away with rain water. The coating surface is thus self cleaned. Since the surface of substrate experiences a high degree of self-cleaning by natural action in this way, the surface is kept clean, eliminating or substantially eliminating cleaning operation.

In a further embodiment of the invention, a photocatalytic silicone coating is formed on substrates to be anti-fouling, for example, buildings, structures, machines and articles located outdoor. When an article covered with a photocatalytic silicone coating is exposed to sunlight, the photocatalyst is photo excited whereby the surface of silicone coating is rendered hydrophilic as mentioned above. Urban smog is unlikely to adhere to the hydrophilic surface because the smog contains much lipophilic compounds comprising combustion products such as carbon and soot. Thus, when rain accompanied by floating contaminants such as fumes falls on the coating surface, the contaminants do not remain adhered to the surface, which is kept clean.

In a still further embodiment of the invention, a photocatalytic silicone coating is formed on substrates or articles which tend to be stained with oil and fat and require frequent cleaning, for example, exterior and interior members of buildings, window panes, housing utilities, bathtubs, luminaires, kitchen goods, dinnerware, kitchen sinks, cooking stoves, kitchen hoods, and fans. When such articles stained with oil and fat are immersed in water, wetted with water or rinsed with water, oil stains are liberated from the hydrophilic surface of the photocatalyzed silicone coating and thus easily removed away. Therefore, for example, dishes stained with oil and fat can be washed without a need for detergent.

EXAMPLE

Examples of the invention are given below by way of illustration and not by way of limitation. All parts and percents are by weight unless otherwise stated.

Example 1
(Imparting water affinity to photocatalyzed silicone)

This example demonstrates that a silicone coating having photocatalyst particles dispersed therein is given a high degree of water affinity at the coating surface by photo exciting the photocatalyst.

The substrate used herein was an aluminum plate of 10 cm square. The substrate was smoothened at its surface by applying a two-part type silicone coating composition "Glaska" commercially available from Nippon Synthetic Rubber K.K. to the surface to coat it with a silicone layer. The two-part type silicone coating composition "Glaska" consisted of liquid A in the form of a silica sol in water as a dispersing medium having a solid content of 20% and liquid B in the form of methyltrimethoxysilane $CH_3Si(OCH_3)_3$. Liquids A and B were mixed at a weight ratio A:B=3:1, the mixture was applied to the aluminum plate and cured at a temperature of 150° C., yielding an aluminum plate covered with a silicone base coat of 3 μm thick (sample #1). Several coated aluminum plates (samples #1) were prepared in this way.

Next, sample #1 was coated with a photocatalyzed silicone coating composition. More specifically, a coating composition containing photocatalytic titania was prepared by mixing anatase titania sol of nitric acid peptization type using aqueous nitric acid as a dispersing medium (TA-15 commercially available from Nissan Chemical K.K., mean particle size 0.01 μm, solids 15%) with liquid A (silica sol) of "Glaska", diluting the mixture with ethanol, and adding liquid B (methyltrimethoxysilane) of "Glaska" thereto. This coating composition contained 39 parts of silica, 97 parts of methyltrimethoxysilane, and 87 parts of titania.

The photocatalyzed coating composition was applied to a surface of sample #1 and cured at a temperature of 150° C. to form a top coat in the form of a silicone coating having anatase titania particles dispersed therein, yielding sample #2.

Next, using a 20-W black light blue (BLB) fluorescent lamp (FL20BLB by Sankyo Electric K.K.), sample #2 was irradiated with UV radiation at an illuminance of 0.5 mW/cm² for 5 days, yielding sample #3. This sample was measured for contact angle at the surface with water by means of a contact angle meter model G-I-1000 (manufactured by ERMA, low angle detection limit 3°). A reading of contact angle was less than 3°, indicating a high degree of water affinity.

Sample #2 before UV exposure was similarly measured to find a contact angle of 70°. On similar measurement, sample #1 had a contact angle of 90°. After sample #1 was irradiated with UV radiation for 5 days under the same conditions as sample #2, the exposed sample) was similarly measured to find a contact angle of 85°.

It is seen that although silicone in itself is considerably hydrophobic, dispersion and excitation of a photocatalyst imparts a high degree of water affinity to silicone.

Figure 1B:
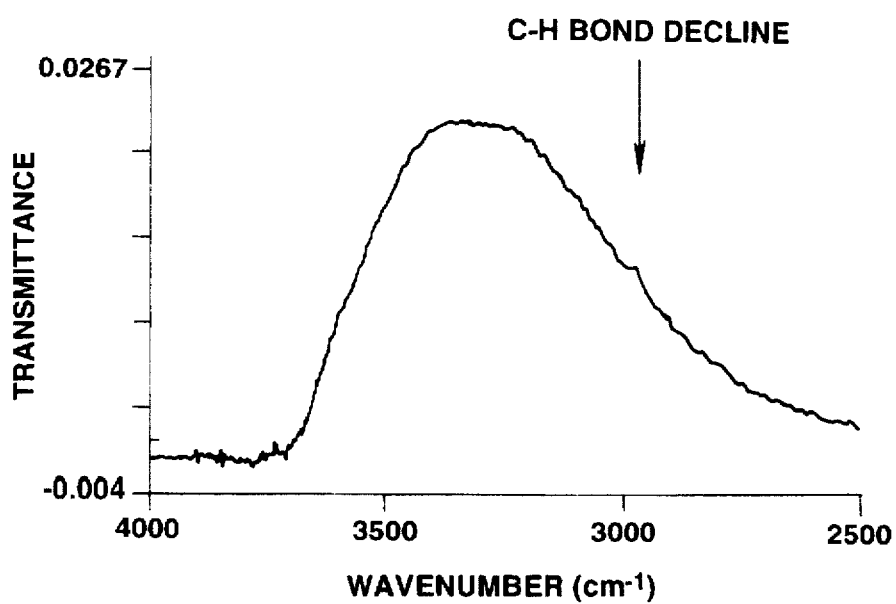

Sample #2 was allowed to stand outdoor for several days and hence, exposed to UV radiation in sunlight, yielding sample #4. Sample #4 after UV exposure was similarly measured to find a contact angle with water of less than 10°, indicating a high degree of water affinity. Samples #2 and #4 on the surface were examined by infrared (IR) spectroscopy. IR absorption spectra of sample #2 before UV exposure and sample #4 after UV exposure are shown in the graphs of FIGS. 1(a) and 1(b), respectively. A comparison of these curves reveals that stretching vibration at 2970 cm⁻¹ of a carbon-to-hydrogen bond of a methyl group disappeared as a result of UV exposure. This suggests that as a result of irradiating a photocatalyzed silicone coating with UV radiation, methyl groups attached to silicon atoms of silicone molecules at the coating surface disappeared.

Figure 2:
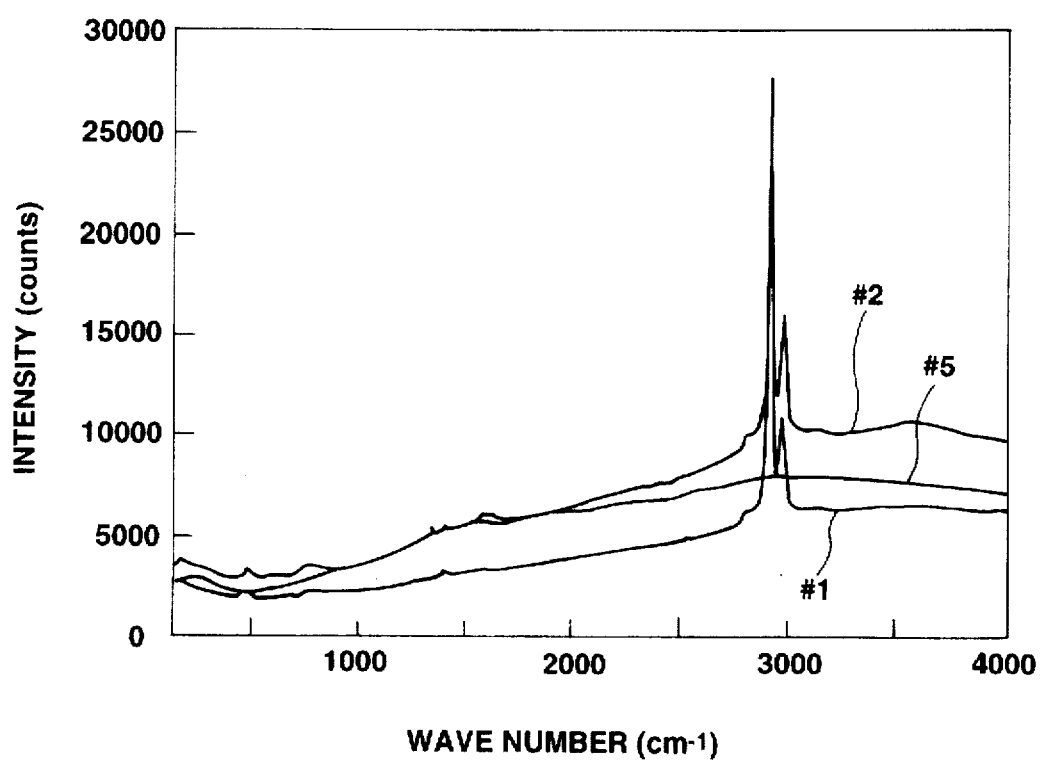
FIG. 2 is a diagram showing Raman spectra of three samples of Example 1 before and after UV exposure.

Using a mercury lamp, sample #2 was irradiated with UV radiation at an illuminance of 22.8 mW/cm² for 2 hours, yielding sample #5. Sample #2 before UV exposure and sample #5 after UV exposure were examined by Raman spectroscopy. For comparison purposes, sample #1 was also irradiated with UV radiation under the same conditions and examined by Raman spectroscopy before and after UV exposure. The Raman spectra are shown in the graph of FIG. 2. Since sample #1 showed an identical Raman spectrum before and after UV exposure, it is shown by a common curve #1 in the graph of FIG. 2.

A review of the graph of FIG. 2 reveals that in the Raman spectrum of sample #2, a significant peak attributable to C—H bond symmetric stretch in sp³ hybrid orbit appears at the position of wavenumber 2910 cm⁻¹, and a peak attributable to C—H bond antisymmetric stretch in sp³ hybrid orbit appears at the position of wavenumber 2970 cm⁻¹. Therefore, the presence of a C—H bond in sample #2 is concluded.

In the Raman spectrum of sample #5, no peaks are observable at the positions of wavenumber 2910 cm⁻¹ and wavenumber 2970 cm⁻¹. Instead, a broad peak attributable to O—H bond symmetric stretch is observable at the position of wavenumber 3200 cm⁻¹. Therefore, the absence of a C—H bond and the presence of an O—H bond at the surface of sample #5 are concluded.

In contrast, in the Raman spectrum of sample #1 both before and after UV exposure, a significant peak attributable to C—H bond symmetric stretch in sp³ hybrid orbit appears at the position of wavenumber 2910 cm⁻¹, and a peak attributable to C—H bond antisymmetric stretch in sp³ hybrid orbit appears at the position of wavenumber 2970 cm⁻¹. Therefore, the presence of a C—H bond at the surface of sample #1 is confirmed.

It is thus understood that when photocatalyzed silicone is irradiated with UV radiation, organic groups (R) attached to silicon atoms of a silicone molecule represented by the following formula (1) are replaced by hydroxyl groups (OH) in the presence of moisture in the air under the impetus of photocatalysis, whereupon a silicone as represented by the following formula (2) is formed at the surface. As a result, the silicone coating acquires a high degree of water affinity at the surface.

Example 2
(A change of contact angle with the content of photocatalyst)

Several 200-ml flasks were charged with mixtures of silica sol (solids 10%), photocatalytic anatase type titania sol (TA-15 by Nissan Chemical K.K., solids 15%), and copper acetate (copper acetate monohydrate) powder in different blend ratios as shown in Table 1. After the contents were stirred at room temperature for 30 minutes, ethanol was added thereto, and methyltrimethoxysilane $CH_3Si(OCH_3)_3$ in the amount shown in Table 1 was slowly added dropwise. Upon stirring for 2 hours, the methyltrimethoxysilane was hydrolyzed with water available in the system, and the hydrolyzates were partially converted into an organopolysiloxane through dehydrating polycondensation. In this way, there were obtained five coating liquids (#1 to #5) containing the organopolysiloxane as a main component and having different contents of titania. These coating liquids had a solid content of 3%. In Table 1, the weight of titania relative to the sum of the weight of organopolysiloxane and the weight of silica is reported. The weight of organopolysiloxane is calculated as $CH_3SiO_{3/2}$ formed by complete hydrolysis and polycondensation of methyltrimethoxysilane. Note that coating liquid #5, which was free of titania as seen from Table 1, was prepared for comparison purposes. Copper acetate and silica were added as an additive and filler, respectively, although they are not essential.

TABLE 1

| | Composition of coating liquids | | | | |
|---|---|---|---|---|---|
| | Coating liquid | | | | |
| Components (g) | #1 | #2 | #3 | #4 | #5 |
| $TiO_2$/(siloxane + silica) | 80/20 | 50/50 | 20/80 | 10/90 | 0/100 |
| Silica sol | 3.0 | 7.5 | 12.0 | 13.5 | 15.0 |
| Titania sol | 26.7 | 16.7 | 6.67 | 3.33 | 0 |
| $CH_3Si(OCH_3)_3$ | 1.42 | 3.55 | 5.68 | 6.38 | 7.1 |
| Ethanol | 135.6 | 139.0 | 142.4 | 143.5 | 144.6 |
| Copper acetate* | 0.1 | 0.1 | 0.1 | 0.1 | 0.1 |

*Copper acetate: Copper (II) acetate monohydrate was added in an amount of 2% based on the solids combined.

Each of coating liquids #1 to #5 was applied to an aluminum plate of 0.3 mm thick by a flow coating technique and heated at a temperature of 170° C. for 15 minutes for curing the organopolysiloxane, obtaining samples #1 to #5 covered with a silicone coating of 0.2 to 0.5 μm in dry thickness having photocatalytic titania dispersed therein.

While samples #1 to #5 were continuously irradiated with UV radiation from a BLB fluorescent lamp spaced a distance of 10 cm at an illuminance of 0.6 mW/cm², it was determined how the contact angle at the surface with water changed. The contact angle with water was measured by dropping a droplet of 5 μl pure water on the surface of each sample from a microsyringe and measuring the angle after 30 seconds by means of a contact angle meter model CA-X150 (manufactured by Kyowa Interface Science K.K., low angle detection limit 1°).

Figure 3:
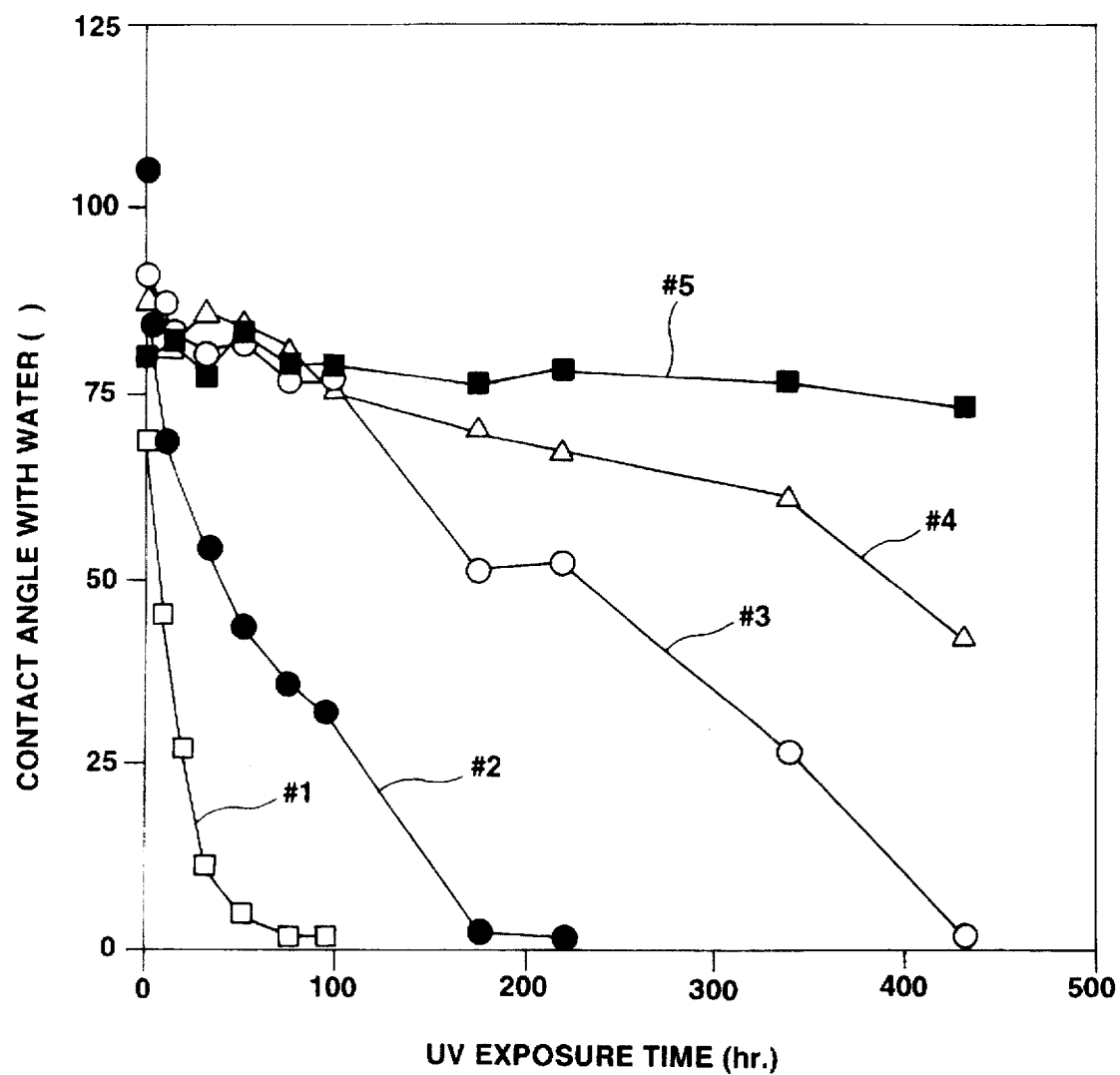
FIG. 3 is a graph showing contact angle vs. UV exposure time of samples having different contents of photocatalyst in Example 2.

The contact angle with water was plotted in the graph of FIG. 3 to show how the contact angle changed with the UV exposure time. As seen from curve #1, sample #1 which was coated with coating liquid #1 containing 20 parts of organopolysiloxane and silica combined and 80 parts of photocatalytic titania acquired a high degree of water affinity within a short time of UV exposure. The time required to impart water affinity increased as the content of photocatalyst decreased. The coating formed from coating liquid #4 containing 90 parts of organopolysiloxane and silica combined and 10 parts of photocatalytic titania acquired water affinity of the order of a contact angle with water of less than 60° when it was exposed to UV for a sufficient time. However, sample #5 having a silicone coating free of photocatalyst could not acquire water affinity even when UV was irradiated for an extended time.

Example 3
(Synthesis of organopolysiloxanes from silanes)
A number of organopolysiloxane solutions were prepared by hydrolysis and partial dehydration polycondensation of various silanes.
Synthesis of siloxane solution #1
A 1-liter flask was charged with 24 g (0.2 mol) of dimethyldimethoxysilane $(CH_3)_2Si(OCH_3)_2$, 142.4 g (0.8 mol) of methyltriethoxysilane $CH_3Si(OC_2H_5)_3$, and 71 g of ethanol. While the contents were cooled at a temperature of lower than 10° C., 50.4 g (2.8 mol) of 0.05N dilute hydrochloric acid was added dropwise as a hydrolysis catalyst whereby the alkoxysilanes were hydrolyzed with water available from the dilute hydrochloric acid. After the completion of dropwise addition, the contents were stirred at room temperature for 6 hours, during which period hydrolysis was continued and the hydrolyzates were subject to partial dehydration polycondensation. There was obtained an organopolysiloxane-containing solution #1 (solids 25%). The siloxane solution #1 was analyzed for a grouping attached to a silicon atom by nuclear magnetic resonance using silicon isotope $^{29}Si$ ($^{29}Si$-NMR, 59.6 MHz), observing five signals (−10, −19, −47, −56 and −64 ppm) indicative of structural units represented by the formulae shown in Table 2. Table 2 also shows the proportion of the respective structural units calculated from signal area ratios.

TABLE 2

| $^{29}Si$-NMR analysis of solution #1 | | |
|---|---|---|
| Chemical shift | Structural unit | Proportion |
| −10 ppm | $Me_2Si(OX)O_{0.5}$ | 1 mol % |
| −19 ppm | $Me_2SiO$ | 19 mol % |
| −47 ppm | $MeSi(OX)_2O_{0.5}$ | 3 mol % |
| −56 ppm | $Me_2Si(OX)_1O_{1.0}$ | 25 mol % |
| −64 ppm | $MeSiO_{1.5}$ | 52 mol % |
| Total | | 100 mol % |

Me = methyl
X = hydrogen, methyl or ethyl

Based on the amounts of residual alkoxy group and hydroxyl group which were estimated from the signal intensity ratios of $^{29}Si$-NMR, the organopolysiloxane was determined to have the average compositional formula:

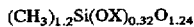
$(CH_3)_{1.2}Si(OX)_{0.32}O_{1.24}$ wherein X=H, $CH_3$ or $CH_3CH_2$ group. The number average molecular weight Mn of the organopolysiloxane was measured by gel permeation chromatography (GPC) using polystyrene as a standard, finding Mn=5.1×10².
Synthesis of siloxane solution #2
A 1-liter flask was charged with 12 g (0.1 mol) of dimethyldimethoxysilane, 106.8 g (0.6 mol) of methyltriethoxysilane, and 56.3 g of ethanol. While the contents were cooled at a temperature of lower than 10° C., 90 g (silica 18 g, 0.3 mol) of weakly acidic silica sol in water as a dispersing medium ("Snowtex-O" by Nissan Chemical K.K., silica solids 20% pH 3.0) was added dropwise whereby the alkoxysilanes were hydrolyzed with water available from the silica sol. After the completion of dropwise addition, the contents were stirred at room temperature for 6 hours, during which period hydrolysis was continued and the hydrolyzates were subject to partial dehydration polycondensation. There was obtained an organopolysiloxane-containing solution #2 (solids 25%). On measurement, the organopolysiloxane had a number average molecular weight $Mn=5.7\times10^2$. Based on the amounts of residual alkoxy group and hydroxyl group which were estimated from the signal intensity ratios of $^{29}$Si-NMR, the organopolysiloxane was determined to have the average compositional formula:

$$(CH_3)_{0.8}Si(OX)_{0.24}O_{1.48}$$

wherein X=H, $CH_3$ or $CH_3CH_2$ group.

Synthesis of siloxane solution #3

A 1-liter flask was charged with 12 g (0.1 mol) of dimethyldimethoxysilane, 158.4 g (0.8 mol) of phenyltrimethoxysilane $C_6H_5Si(OCH_3)_3$, and 266 g of ethanol. While the contents were cooled at a temperature of lower than 10° C., 30 g (silica 6 g, 0.1 mol) of silica sol "Snowtex-O" was added dropwise whereby the alkoxysilanes were hydrolyzed with water available from the silica sol. After the completion of dropwise addition, the contents were stirred at room temperature for 6 hours, during which period hydrolysis was continued and the hydrolyzates were subject to partial dehydration polycondensation. There was obtained an organopolysiloxane-containing solution #3 (solids 25%). On measurement, the organopolysiloxane had a number average molecular weight $Mn=7.1\times10^2$. Based on the amounts of residual alkoxy group and hydroxyl group which were estimated from the signal intensity ratios of $^{29}$Si-NMR, the organopolysiloxane was determined to have the average compositional formula:

$$(CH_3)_{0.2}Ph_{0.8}Si(OX)_{0.20}O_{1.40}$$

wherein Ph=phenyl group and X=H or $CH_3$ group.

Synthesis of siloxane solution #4

A 1-liter flask was charged with 68 g (0.5 mol) of methyltrimethoxysilane, 94.4 g (0.4 mol) of γ-glycidoxypropyltrimethoxysilane, and 232.8 g of ethanol. While the contents were cooled at a temperature of lower than 10° C., 30 g (silica 6 g, 0.1 mol) of silica sol "Snowtex-O" was added dropwise whereby the alkoxysilanes were hydrolyzed with water available from the silica sol. After the completion of dropwise addition, the contents were stirred at room temperature for 6 hours, during which period hydrolysis was continued and the hydrolyzates were subject to partial dehydration polycondensation. There was obtained an organopolysiloxane-containing solution #4 (solids 25%). On measurement, the organopolysiloxane had a number average molecular weight $Mn=7.8\times10^2$. Based on the amounts of residual alkoxy group and hydroxyl group which were estimated from the signal intensity ratios of $^{29}$Si-NMR, the organopolysiloxane was determined to have the average compositional formula:

$$(CH_3)_{0.5}R_{0.4}Si(OX)_{0.24}O_{1.43}$$

wherein R=γ-glycidoxypropyl group and X=H or $CH_3$ group.

Synthesis of siloxane solution #5

A 1-liter flask was charged with 108.8 g (0.8 mol) of methyltrimethoxysilane, 15.2 g (0.1 mol) of tetramethoxysilane $Si(OCH_3)_4$, and 108.4 g of ethanol. While the contents were cooled at a temperature of lower than 10° C., 30 g (silica 6 g, 0.1 mol) of silica sol "Snowtex-O" was added dropwise whereby the alkoxysilanes were hydrolyzed with water available from the silica sol. After the completion of dropwise addition, the contents were stirred at room temperature for 6 hours, during which period hydrolysis was continued and the hydrolyzates were subject to partial dehydration polycondensation. There was obtained an organopolysiloxane-containing solution #5 (solids 25%). On measurement, the organopolysiloxane had a number average molecular weight $Mn=4.9\times10^2$. Based on the amounts of residual alkoxy group and hydroxyl group which were estimated from the signal intensity ratios of $^{29}$Si-NMR, the organopolysiloxane was determined to have the average compositional formula:

$$(CH_3)_{0.8}Si(OX)_{0.32}O_{1.44}$$

wherein X=H or $CH_3$ group.

Synthesis of siloxane solution #6

A 1-liter flask was charged with 12 g (0.1 mol) of dimethyldimethoxysilane, 158.4 g (0.8 mol) of phenyltrimethoxysilane, and 234.2 g of ethanol. While the contents were cooled at a temperature of lower than 10° C., 30 g (silica 6 g, 0.1 mol) of silica sol "Snowtex-O" and 31.8 g of 0.05N dilute hydrochloric acid as a hydrolysis catalyst were added dropwise whereby the alkoxysilanes were hydrolyzed with water available from the silica sol and dilute hydrochloric acid. After the completion of dropwise addition, the contents were stirred at room temperature for 6 hours, during which period hydrolysis was continued and the hydrolyzates were subject to partial dehydration polycondensation. There was obtained an organopolysiloxane-containing solution #6 (solids 25.8%). On measurement, the organopolysiloxane had a number average molecular weight $Mn=7.1\times10^2$. Based on the amounts of residual alkoxy group and hydroxyl group which were estimated from the signal intensity ratios of $^{29}$Si-NMR, the organopolysiloxane was determined to have the average compositional formula:

$$(CH_3)_{0.2}Ph_{0.8}Si(OX)_{0.20}O_{1.40}$$

wherein Ph=phenyl group and X=H or $CH_3$ group.

Synthesis of siloxane solution #7

A 1-liter flask was charged with 68 g (0.5 mol) of methyltrimethoxysilane, 94.4 g (0.4 mol) of γ-glycidoxypropyltrimethoxysilane, and 197.4 g of ethanol. While the contents were cooled at a temperature of lower than 10° C., 30 g (silica 6 g, 0.1 mol) of silica sol "Snowtex-O" and 35.4 g of 0.05N dilute hydrochloric acid as a hydrolysis catalyst were added dropwise whereby the alkoxysilanes were hydrolyzed with water available from the silica sol and dilute hydrochloric acid. After the completion of dropwise addition, the contents were stirred at room temperature for 6 hours, during which period hydrolysis was continued and the hydrolyzates were subject to partial dehydration polycondensation. There was obtained an organopolysiloxane-containing solution #7 (solids 26.1%). On measurement, the organopolysiloxane had a number average molecular weight $Mn=7.8\times10^2$. Based on the amounts of residual alkoxy group and hydroxyl group which were estimated from the signal intensity ratios of $^{29}$Si-NMR, the organopolysiloxane was determined to have the average compositional formula:

$$(CH_3)_{0.5}R_{0.4}Si(OX)_{0.24}O_{1.43}$$

wherein R=γ-glycidoxypropyl group and X=H or $CH_3$ group.

Synthesis of siloxane solution #8

A 1-liter flask was charged with 108.8 g (0.8 mol) of methyltrimethoxysilane, 15.2 g (0.1 mol) of tetramethoxysilane, and 71.2 g of ethanol. While the contents were cooled at a temperature of lower than 10° C., 30 g (silica 6 g, 0.1 mol) of silica sol "Snowtex-O" and 37.2 g of 0.05N dilute hydrochloric acid as a hydrolysis catalyst were added dropwise whereby the alkoxysilanes were hydrolyzed with water available from the silica sol and dilute hydrochloric acid. After the completion of dropwise addition, the contents were stirred at room temperature for 6 hours, during which period hydrolysis was continued and the hydrolyzates were subject to partial dehydration polycondensation. There was obtained an organopolysiloxane-containing solution #8 (solids 26.2%). On measurement, the organopolysiloxane had a number average molecular weight $Mn=4.9\times10^2$. Based on the amounts of residual alkoxy group and hydroxyl group which were estimated from the signal intensity ratios of $^{29}$Si-NMR, the organopolysiloxane was determined to have the average compositional formula:

$(CH_3)_{0.8}Si(OX)_{0.32}O_{1.44}$ wherein X=H or $CH_3$ group.

Example 4
(Preparation and application of photocatalyzed coating compositions and Evaluation of coatings)

In organopolysiloxane-containing solutions #1 to #5 of Example 3, photocatalytic titania sol (TA-15 by Nissan Chemical K.K., solids 15%) and an organic solvent (a 7/3 mixture of ethanol and propylene glycol monomethyl ether) were blended in the proportion shown in Table 3. There were prepared photocatalyzed coating liquids #1 to #5 having a solid content of 3% (titania 1.5% and organopolysiloxane 1.5%).

For comparison purposes, the same organic solvent was blended in organopolysiloxane-containing solutions #1 to #5 of Example 3 in the proportion shown in Table 3. There were prepared photocatalyst-free coating liquids #6 to #10 having a organopolysiloxane solid content of 3%.

TABLE 3

| | Composition (g) of coating liquids | | | | | | | | | |
|---|---|---|---|---|---|---|---|---|---|---|
| | Coating liquid | | | | | | | | | |
| | #1 | #2 | #3 | #4 | #5 | #6 | #7 | #8 | #9 | #10 |
| Solution #1 | 3 | — | — | — | — | 6 | — | — | — | — |
| Solution #2 | — | 3 | — | — | — | — | 6 | — | — | — |
| Solution #3 | — | — | 3 | — | — | — | — | 6 | — | — |
| Solution #4 | — | — | — | 3 | — | — | — | — | 6 | — |
| Solution #5 | — | — | — | — | 3 | — | — | — | — | 6 |
| Titania sol | 5 | 5 | 5 | 5 | 5 | 0 | 0 | 0 | 0 | 0 |
| Solvent | 42 | 42 | 42 | 42 | 42 | 44 | 44 | 44 | 44 | 44 |

Each of coating liquids #1 to #10 was applied to an aluminum plate of 0.3 mm thick by a flow coating technique and heated at a temperature of 150° C. for 20 minutes for curing the organopolysiloxane, obtaining samples #1 to #10 covered with a silicone coating of 0.2 to 1.0 μm in dry thickness. As shown in Table 3, the silicone coatings of samples #1 to #5 contained photocatalytic titania, but the silicone coatings of samples #6 to #10 did not.

Coated samples #1 to #10 were subject to a bending test for examining the silicone coating for flexibility. Each sample was put on a stainless steel bar of 20 mm diameter with the coating faced outside, and bent around the bar whereupon the coating was observed for peeling, cracking and discoloration. The coating was rated "⊚" when it was fully flexible, "○" when it was fully flexible though slightly discolored, "Δ" when it was discolored and slightly cracked, and "X" when it was peeled or cracked. The test results are shown in the row of "Flexibility" in Table 4.

TABLE 4

| | Coated sample | | | | | | | | | |
|---|---|---|---|---|---|---|---|---|---|---|
| | #1 | #2 | #3 | #4 | #5 | #6 | #7 | #8 | #9 | #10 |
| Contact angle (°) | | | | | | | | | | |
| Before exposure | 121 | 91 | 92 | 82 | 78 | 115 | 95 | 87 | 84 | 76 |
| After exposure | 10 | 12 | 47 | 50 | 8 | 102 | 90 | 85 | 78 | 57 |
| Outer appearance | ○ | ○ | ○ | ○ | ○ | X | ○ | ○ | X | ○ |
| Flexibility | ⊚ | ○ | ○ | Δ | X | ⊚ | ○ | ○ | Δ | X |

As seen from Table 4, the silicone coatings of samples #1 to #3 which were formed from coating liquids #1 to #3 prepared from difunctional silane-containing monomeric compositions showed excellent flexibility whereas the silicone coatings of samples #4 and #5 which were formed from coating liquid #4 prepared from only trifunctional silanes and coating liquid #5 prepared from trifunctional and tetrafunctional silanes were less flexible.

Separately, coated samples #1 to #10 were subject to an outdoor exposure test. The samples were placed horizontal on the roof of a building in Silicone Electronic Material Technical Laboratory of Shin-Etsu Chemical Industry Co., Ltd. (Matsuida-cho, Usui-gun, Gunma, Japan) and left there for two weeks, that is, exposed to UV radiation in sunlight. Before and after the outdoor exposure, the samples were measured for contact angle with water. Also they were visually examined how the outer appearance of the silicone coating changed, that is, examined for surface fouling. The change of outer appearance is rated "○" when the outer appearance remained substantially unchanged and "X" when the surface was fouled. The contact angles with water and outer appearance of the sample surface before and after outdoor exposure are also shown in Table 4.

As seen from Table 4, the silicone coatings of samples #1 to #5 containing photocatalytic titania were not foul in outer appearance because their surface was rendered hydrophilic by outdoor exposure. The silicone coatings of samples #6 to #10 free of photocatalytic titania were not rendered hydrophilic by outdoor exposure and some (samples #6 and #9) were foul.

Example 5
(Preparation and application of photocatalyzed coating compositions and Evaluation of coatings)

In organopolysiloxane-containing solutions #1, #2, #6, #7, and #8 of Example 3, photocatalytic titania sol (TA-15 by Nissan Chemical K.K.), silica sol dispersed in methanol (solids 15%), and an organic solvent (a 7/3 mixture of ethanol and propylene glycol monomethyl ether) were blended in the proportion shown in Table 5. There were prepared photocatalyzed coating liquids #1 to #5 having a solid content of 3% (titania 1.5%).

For comparison purposes, the same organic solvent was blended in organopolysiloxane-containing solutions #1, #2, #6, #7, and #8 of Example 3 in the proportion shown in Table 5. There were prepared photocatalyst-free coating liquids #6 to #10 having an organopolysiloxane solid content of 3%.

TABLE 5

| | Composition (g) of coating liquids | | | | | | | | | |
|---|---|---|---|---|---|---|---|---|---|---|
| | Coating liquid | | | | | | | | | |
| | #1 | #2 | #3 | #4 | #5 | #6 | #7 | #8 | #9 | #10 |
| Solution #1 | 18 | — | — | — | — | 18 | — | — | — | — |
| Solution #2 | — | 18 | — | — | — | — | 18 | — | — | — |
| Solution #6 | — | — | 18 | — | — | — | — | 18 | — | — |
| Solution #7 | — | — | — | 18 | — | — | — | — | 18 | — |
| Solution #8 | — | — | — | — | 18 | — | — | — | — | 18 |
| Silica sol | 10 | 10 | 10 | 10 | 10 | 50 | 50 | 50 | 50 | 50 |
| Titania sol | 40 | 40 | 40 | 40 | 40 | 0 | 0 | 0 | 0 | 0 |
| Solvent | 332 | 332 | 332 | 332 | 332 | 332 | 332 | 332 | 332 | 332 |

Bending test

Each of coating liquids #1 to #10 was applied to an aluminum plate of 0.3 mm thick by a flow coating technique and heated at a temperature of 150° C. for 20 minutes for curing the organopolysiloxane, obtaining samples covered with a silicone coating of 0.2 to 0.5 μm in dry thickness.

The coated samples were subject to a bending test for examining the silicone coating for flexibility. Each sample was put on a stainless steel bar of 20 mm diameter with the coating faced outside, and bent around the bar whereupon the coating was observed for peeling, cracking and discoloration. The coating was rated "O" when it was fully flexible and "X" when it was peeled or cracked. The test results are shown in the row of "Flexibility" in Table 6.

TABLE 6

| | Coating liquid | | | | | | | | | |
|---|---|---|---|---|---|---|---|---|---|---|
| | #1 | #2 | #3 | #4 | #5 | #6 | #7 | #8 | #9 | #10 |
| Contact angle (°) | | | | | | | | | | |
| Before exposure | 121 | 91 | 92 | 69 | 76 | 115 | 95 | 87 | 84 | 76 |
| After exposure | 10 | 12 | 27 | 2 | 4 | 102 | 90 | 85 | 82 | 74 |
| Transparency | O | O | O | O | O | O | O | O | O | O |
| Hardness | H | 2H | 2H | 3H | 4H | H | 2H | 2H | 3H | 4H |
| Flexibility | O | O | O | O | X | O | O | O | O | X |
| Shelf stability | O | O | O | O | X | O | O | O | O | X |
| Anti-fogging | O | O | O | O | O | X | X | X | X | X |
| Self-cleaning | O | O | O | O | O | X | X | X | X | X |

As seen from Table 6, the silicone coatings which were formed from coating liquids #1–#4 and #6–#9 prepared from difunctional and trifunctional silanes showed excellent flexibility whereas the silicone coatings which were formed from coating liquids #5 and #10 prepared from trifunctional and tetrafunctional silanes were less flexible.

Shelf stability (pot life)

Coating liquids #1 to #10 were shelf stored at 30° C. for one month before they were applied and cured to substrates. The cured coatings were visually examined for outer appearance and transparency, by which the coating liquids were evaluated for shelf stability. The coating liquid was rated "O" when it was shelf stable and "X" when it was unstable. The results are also shown in Table 6.

It is seen that coating liquid #4 prepared from solution #7 of an organopolysiloxane having a γ-glycidoxypropyl group was unlikely to harden and regarded fully shelf stable. In contrast, coating liquids #5 and #10 prepared from solution #8 starting with tetrafunctional silane in Example 3 was regarded shelf unstable.

Self-cleaning test

An acryl resin base white paint was applied to a plurality of aluminum plates of 0.3 mm thick and cured to form an acryl resin coating of 20 to 30 μm thick. Then coating liquids #1 to #10 were applied to the acryl coating by dip coating at a pull-up rate of 150 mm/min. They were heated at a temperature of 150° C. for 20 minutes for curing the organopolysiloxane, obtaining a corresponding plurality of samples covered with a silicone coating of 0.2 to 0.5 μm in dry thickness.

The coated samples were subject to an outdoor exposure test. The samples were attached to an exposure base installed at an angle of 450 on the ground in the area of Silicone Electronic Material Technical Laboratory of Shin-Etsu Chemical Industry Co., Ltd. and left there for two months, that is, exposed to sunlight, falling fumes and rainfall.

Before and after the 2-month outdoor exposure, the samples were measured for whiteness (W) on the surface according to JIS L0803 by means of a color difference meter model SE-2000 by Nippon Denshoku Kogyo K.K. A change ΔW of whiteness from the initial was calculated according to ΔW=(1−We/Wi)×100% wherein We is a whiteness after exposure and Wi is an initial whiteness. Self-cleaning ability was evaluated in terms of the whiteness change ΔW. The self-cleaning ability is rated good (O) when ΔW≦5%, moderate when 5%<ΔW<10%, and poor (X) when ΔW≧10%. The results are also shown in Table 6.

It is evident from Table 6 that since the silicone coatings which were formed from photocatalyzed coating liquids #1 to #5 were rendered hydrophilic on the surface by UV radiation in sunlight reaching in the daytime, fumes deposited on the coating surface were washed away with rainwater whenever rain fell on the coatings. The coating surface was self cleaned in this way. In contrast, since the silicone coatings which were formed from photocatalyst-free coating liquids #6 to #10 were not rendered hydrophilic on the surface, their surface was fouled with depositing fumes with the lapse of time.

Transparency and Pencil hardness test

Coating liquids #1 to #10 were applied to a plurality of glass plates of 1.5 mm thick by dip coating at a pull-up rate of 150 mm/min. and heated at a temperature of 150° C. for 20 minutes for curing the organopolysiloxane, obtaining a corresponding plurality of glass samples covered with a silicone coating of 0.2 to 0.5 μm in dry thickness.

The coatings of these samples were examined for transparency by means of a haze meter ("DIRECT READING HAZE METER" by Toyo Seiki K.K.). The coating was rated fully transparent (O) when the turbidity (ΔH) was up to 3.0 and less transparent (X) when ΔH was more than 3.0. The results are also shown in Table 6. The coatings of all the samples were satisfactory with respect to transparency.

A pencil scratch test was carried out on the silicone coatings for examining hardness and mar resistance. The surface of each sample was scratched with a pointed core of pencil to determine the hardest pencil core with which the silicone coating was peeled. The results are shown in Table 6. It is seen that a silicone coating increases its hardness as the proportion of tetrafunctional silane in a monomer composition from which an organopolysiloxane solution is prepared increases.

Water affinity test

The same samples as used in the pencil hardness test were exposed to sunlight in a two-week outdoor exposure test in the same manner as in Example 4. The samples were measured for a contact angle with water at the surface. The contact angles with water before and after the outdoor exposure are shown in Table 6. It is evident from Table 6 that the silicone coatings formed from photocatalyzed coating liquids #1 to #5 had acquired a high degree of water affinity during the outdoor exposure. Especially, the silicone coating formed from coating liquid #4 of an organopolysiloxane having a γ-glycidoxypropyl group has a full ability to impart water affinity. In contrast, the silicone coatings formed from photocatalyst-free coating liquids #6 to #10 were not given water affinity at all.

Anti-fogging test

In a room with a humidity of 50 to 60%, 500-ml beakers were filled with water at about 90° C. The samples (coated glass plates) which had been subject to outdoor exposure in the water affinity test were rested on the beakers whereupon the samples were exposed to steam. Fog resistance was evaluated by visually observing whether or not the glass plates were fogged. Fog resistance was evaluated in three ratings: "◯" when the glass plate was not fogged at all or fog disappeared by transforming into a water film within 15 seconds, "Δ" when some water droplets adhered, but visibility was not lost, and "X" when the glass plate was fogged due to adherence of minute water droplets. The results are also shown in Table 6. Fog occurred on none of the silicone coatings formed from the photocatalyzed coating liquids and given water affinity whereas the photocatalyst-free silicone coatings were fogged.

Example 6

(Copper added coating composition)

There were prepared photocatalyzed coating liquids in which copper was added as an additive in order to enhance the antibacterial and deodorant properties of silicone coatings in the dark. Specifically, in organopolysiloxane-containing solutions #1, #2, #6, #7, and #8 of Example 3, photocatalytic titania sol (TA-15 by Nissan Chemical K.K.), silica sol dispersed in methanol (solids 15%), an organic solvent (a 7/3 mixture of ethanol and propylene glycol monomethyl ether), and copper acetate (copper acetate monohydrate) powder were blended in the proportion shown in Table 7. Stirring at room temperature for 30 minutes yielded photocatalyzed coating liquids #6 to #10 having a total solid content of 3% (titania 1.5%).

For comparison purposes, photocatalyzed coating liquids #1 to #5 of the composition shown in Table 7 were prepared without adding copper acetate.

TABLE 7

| | Composition (g) of coating liquids | | | | | | | | | |
|---|---|---|---|---|---|---|---|---|---|---|
| | Coating liquid | | | | | | | | | |
| | #1 | #2 | #3 | #4 | #5 | #6 | #7 | #8 | #9 | #10 |
| Solution #1 | 18 | — | — | — | — | 18 | — | — | — | — |
| Solution #2 | — | 18 | — | — | — | — | 18 | — | — | — |
| Solution #6 | — | — | 18 | — | — | — | — | 18 | — | — |
| Solution #7 | — | — | — | 18 | — | — | — | — | 18 | — |
| Solution #8 | — | — | — | — | 18 | — | — | — | — | 18 |
| Silica sol | 10 | 10 | 10 | 10 | 10 | 50 | 50 | 50 | 50 | 50 |
| Titania sol | 40 | 40 | 40 | 40 | 40 | 40 | 40 | 40 | 40 | 40 |
| Solvent | 332 | 332 | 332 | 332 | 332 | 332 | 332 | 332 | 332 | 332 |
| Copper acetate | 0 | 0 | 0 | 0 | 0 | 0.6 | 0.3 | 0.3 | 0.12 | 1.2 |

Each of coating liquids #1 to #10 was applied to an aluminum plate of 0.3 mm thick by a flow coating technique and heated at a temperature of 170° C. for 15 minutes for curing the organopolysiloxane, obtaining a plurality of samples covered with a silicone coating of 0.2 to 0.5 μm in dry thickness.

Antibacterial test

Each sample on the surface was inoculated with *Escherichia coli* by applying 0.15 μl of an inoculum containing $10^5$ CFU/ml of *E. coli* to the sample surface. After the sample was kept in the dark at room temperature for 30 minutes, the cells were recovered to determine the survival rate of *E. coli*. Separately, the sample on the surface was similarly inoculated with *E. coli* and exposed to UV radiation from a 20-W BLB fluorescent lamp (FL20BLB) at an illuminance of 0.02 mW/cm² for 30 minutes before the cells were recovered to determine the survival rate. Based on the survival rate of *E. coli*, the silicone coatings were evaluated for antibacterial activity according to the following criterion.

| Rating | Survival rate of *E. coli* |
|---|---|
| +++ | less than 10% |
| ++ | 10% to less than 30% |
| + | 30% to less than 70% |
| − | 70% or more |

The antibacterial activities of silicone coatings in the dark and during UV exposure are shown in Table 8.

TABLE 8

| | Coating liquid | | | | | | | | | |
|---|---|---|---|---|---|---|---|---|---|---|
| | #1 | #2 | #3 | #4 | #5 | #6 | #7 | #8 | #9 | #10 |
| Contact angle (°) | | | | | | | | | | |
| Before exposure | 121 | 91 | 92 | 69 | 76 | 115 | 95 | 90 | 70 | 70 |
| After exposure | 10 | 12 | 27 | 2 | 4 | 12 | 15 | 25 | 3 | 8 |
| Transparency | ○ | ○ | ○ | ○ | ○ | ○ | ○ | ○ | ○ | ○ |
| Antibacterial activity | | | | | | | | | | |
| UV exposure | ++ | ++ | ++ | ++ | ++ | +++ | +++ | +++ | +++ | +++ |
| In the dark | − | − | − | − | − | +++ | +++ | +++ | ++ | +++ |
| Deodorant | | | | | | | | | | |
| UV exposure | 8% | 5% | 3% | 6% | 5% | 87% | 73% | 70% | 61% | 98% |
| In the dark | 0% | 0% | 0% | 1% | 0% | 72% | 21% | 15% | 4% | 89% |

It is evident from Table 8 that the survival rate of *E. coli* was less than 30% under exposure to UV radiation regardless of whether copper was added or not. This means that *E. coli* cells were destroyed by the optical activity of the excited photocatalyst. In the dark, the silicone coatings formed from copper-free coating liquids #1 to #5 showed a *E. coli* survival rate of more than 70%. In contrast, the silicone coatings formed from copper-added coating liquids #6 to #10 showed a *E. coli* survival rate of less than 30% in the dark. This indicates that when copper is added to a silicone coating, antibacterial activity is exerted even in the dark.

Deodorant test

The samples were placed in a decicator having a volume of 10 liters, into which 500 cc of nitrogen gas containing 100 ppm of methylmercaptan was injected. A 4-W BLB fluorescent lamp was positioned at a distance of 10 cm from the sample whereupon the sample was irradiated with UV radiation at an illuminance of 0.25 mW/cm$^2$ for 30 minutes. Before and after UV exposure, the gas within the desiccator was sampled out and measured for methylmercaptan concentration by gas chromatography. A removal rate ($R_{30}$) of methylmercaptan after 30 minutes of UV exposure was calculated according to $$R_{30}=(C_0-C_{30})/C_0\times100\%$$

wherein $C_0$ is the initial concentration of methylmercaptan and $C_{30}$ is the concentration of methylmercaptan after 30 minutes of UV exposure. Based on the methylmercaptan removal rate ($R_{30}$), the silicone coating was evaluated for deodorant property. Similarly, the removal rate of methylmercaptan in the dark after 30 minutes from methylmercaptan injection was determined. The results are also shown in Table 8.

As seen from Table 8, the silicone coatings formed from copper-added coating liquids #6 to #10 showed a high removal rate of methylmercaptan even in the dark. It is believed that copper adsorbs methylmercaptan.

Each of coating liquids #1 to #10 shown in Table 7 was applied to a glass plate of 1.5 mm thick by dip coating at a pull-up rate of 150 mm/min. and heated at a temperature of 150° C. for 20 minutes for curing the organopolysiloxane, obtaining a plurality of glass samples covered with a silicone coating of 0.2 to 0.5 μm in dry thickness.

The coatings of these samples were examined for transparency by means of a haze meter (Toyo Seiki K.K.). The coatings were fully transparent since the turbidity (ΔH) was less than 3.0.

These samples were exposed to sunlight by carrying out a 2-week outdoor exposure test in the same manner as in Example 4. The samples were measured for contact angle with water at the surface before and after the outdoor exposure. The results are also shown in Table 8. It is evident from Table 8 that the silicone coatings of all the samples acquired a high degree of water affinity upon exposure to sunlight.

Example 7

(Copper added coating composition)

Several 200-ml flasks were charged with mixtures of silica sol dispersed in water (solids 10%), titania sol (TA-15 by Nissan Chemical K.K., solids 15%), and copper acetate (copper acetate monohydrate) powder in different blend ratios as shown in Table 9. After the contents were stirred at room temperature for 30 minutes, ethanol was added thereto, and methyltrimethoxysilane $CH_3Si(OCH_3)_3$ in the amount shown in Table 9 was slowly added dropwise. Upon stirring for 2 hours, the methyltrimethoxysilane was hydrolyzed with water available in the system, and the hydrolyzates were converted into an organopolysiloxane through partial dehydration polycondensation. In this way, there were obtained three organopolysiloxane-containing coating liquids (#1 to #3) having different contents of copper acetate. Coating liquid #1 which was free of copper acetate was prepared for comparison purposes.

TABLE 9

| | Composition (g) of coating liquids | | |
|---|---|---|---|
| Coating liquid | #1 | #2 | #3 |
| Silica sol | 7.5 | 7.5 | 7.5 |
| Titania sol | 16.7 | 16.7 | 16.7 |
| CH$_3$Si(OCH$_3$)$_3$ | 3.55 | 3.55 | 3.55 |
| Ethanol | 139.0 | 139.0 | 139.0 |
| Copper acetate | 0 | 0.1 | 0.5 |
| Copper acetate content* | 0% | 2% | 10% |

*content in the completely cured coating (solid)

Each of coating liquids #1 to #3 was applied to an aluminum plate of 0.3 mm thick by a flow coating technique and heated at a temperature of 170° C. for 15 minutes for curing the organopolysiloxane, obtaining samples #1 to #3 covered with a silicone coating of 0.2 to 0.5 μm in dry thickness.

These samples were tested for antibacterial and deodorant properties by the same tests as in Example 6. The results are shown in Table 10. The ratings are the same as in Table 8.

TABLE 10

| Sample | | #1 | #2 | #3 |
|---|---|---|---|---|
| Antibacterial activity | UV exposure | ++ | +++ | +++ |
| | In the dark | − | + | +++ |
| Deodorant | UV exposure | 8% | 70% | 89% |
| | In the dark | 0% | 4% | 72% |

It is evident from Table 10 that antibacterial and deodorant activities in the dark increase as the amount of copper added increases.

Figure 4:
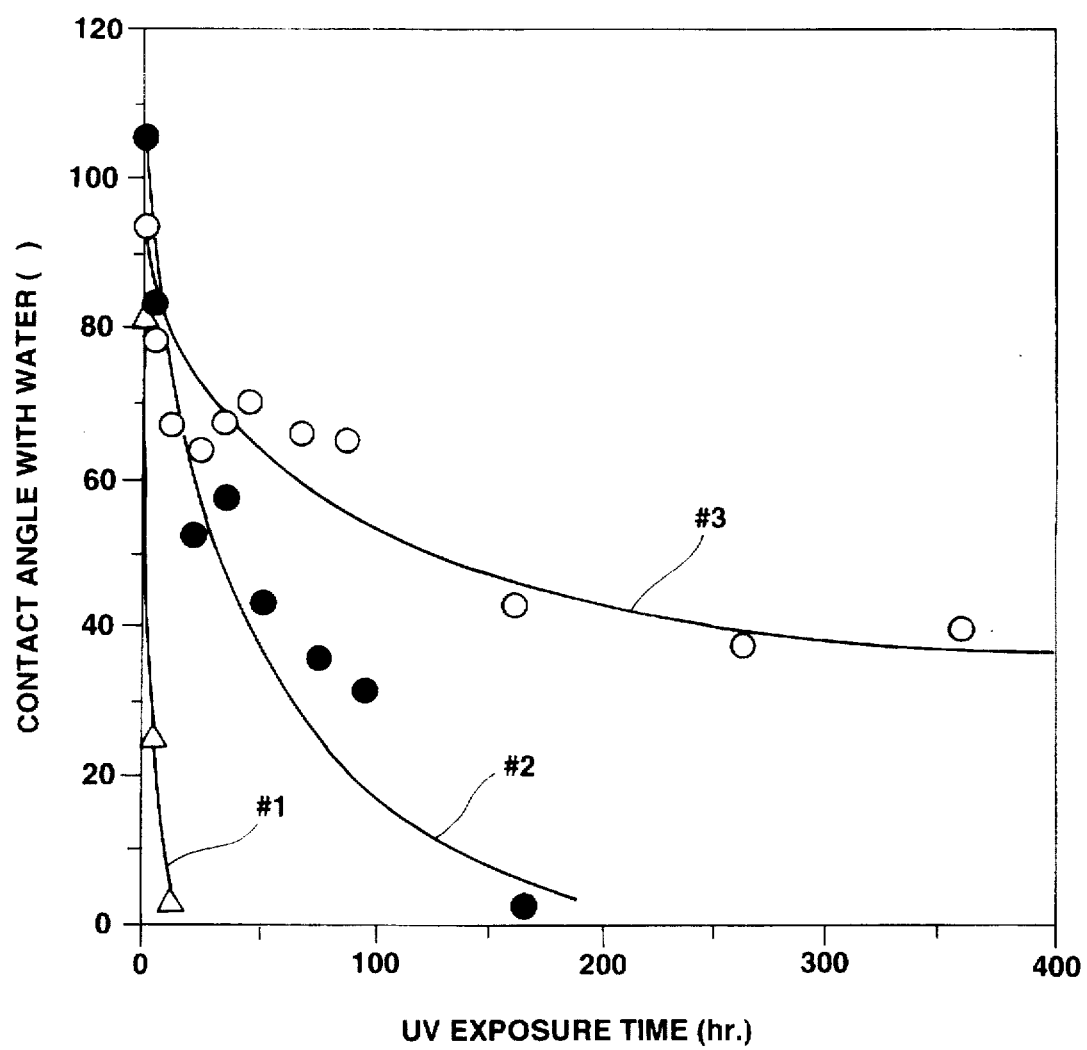
FIG. 4 is a graph showing contact angle vs. UV exposure time of samples having different contents of copper in Example 7.

While samples #1 to #3 were continuously irradiated with UV radiation from a 20-W BLB fluorescent lamp spaced a distance of 10 cm at an illuminance of 0.6 mW/cm$^2$, the contact angle with water at the surface was measured at intervals by means of a contact angle meter model CA-X150. The contact angles were plotted in the graph of FIG. 4 to show a change of contact angle. It is evident that a silicone coating with a less content of copper is more quickly rendered hydrophilic.

Example 8
(Synthesis of organopolysiloxanes from silanes having an organic group of 3 or more carbon atoms)

A number of organopolysiloxane solutions were prepared by hydrolysis and partial dehydration polycondensation of various silanes having an organic group of 3 or more carbon atoms. For comparison purposes, organopolysiloxane solutions were prepared using silanes having an organic group of 1 or 2 carbon atoms.

Synthesis of siloxane solution #1

A 1-liter flask was charged with 164 g (1.0 mol) of n-propyltrimethoxysilane and 98 g of ethanol. While the contents were cooled at a temperature of lower than 10° C., 54.0 g (3.0 mol) of 0.05N dilute hydrochloric acid was added dropwise as a hydrolysis catalyst whereby n-propyltrimethoxysilane was hydrolyzed with water available from the dilute hydrochloric acid. After the completion of dropwise addition, the contents were stirred at room temperature for 12 hours, during which period hydrolysis was continued and the hydrolyzate was subject to partial dehydration polycondensation. There was obtained an organopolysiloxane-containing solution #1 (solids 30%).

The siloxane solution #1 was analyzed for a grouping attached to a silicon atom by $^{29}$Si-NMR (59.6 MHz), observing three signals (−47 to −49 ppm, −56 to −58 ppm, and −66 to −71 ppm) indicative of structural units represented by the formulae shown in Table 11. Table 11 also shows the proportion of the respective structural units calculated from signal area ratios.

TABLE 11

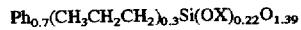

| Chemical shift | Structural unit | Proportion |
|---|---|---|
| −47 to −49 ppm | RSi(OX)$_2$O$_{0.5}$ | 18 mol % |
| −56 to −58 ppm | RSi(OX)$_1$O$_{1.0}$ | 33 mol % |
| −66 to −71 ppm | RSiO$_{1.5}$ | 49 mol % |
| | Total | 100 mol % |

R = n-propyl
X = hydrogen or methyl

Based on the amounts of residual n-propyl group and hydroxyl group which were estimated from the signal intensity ratios of $^{29}$Si-NMR, the organopolysiloxane was found to have the average compositional formula:

$$(CH_3CH_2CH_2)_{1.0}Si(OX)_{0.69}O_{1.24}$$

wherein X=H or CH$_3$ group. On analysis, the organopolysiloxane had a number average molecular weight Mn=6.1×10$^2$.

Synthesis of siloxane solution #2

A 1-liter flask was charged with 277.2 g (1.4 mol) of phenyltrimethoxysilane, 98.4 g (0.6 mol) of n-propyltrimethoxysilane, 225 g of toluene and 22 g of isopropyl alcohol, and further with 7.1 g of 98% methanesulfonic acid as a catalyst. While the contents were cooled at a temperature of lower than 30° C., 64.8 g (3.6 mol) of water was added dropwise whereby phenyltrimethoxysilane was hydrolyzed. After the completion of dropwise addition, the contents were stirred at room temperature for 1 hour, during which period hydrolysis was continued and the hydrolyzates were subject to partial dehydration polycondensation. By neutralizing the reaction solution with sodium bicarbonate, distilling off the formed methanol and solvent in vacuum, diluting the residue with toluene, washing with water, and distilling off the toluene, there was obtained an organopolysiloxane-containing solution #2 in isopropanol (solids 30%).

On analysis, the organopolysiloxane had a number average molecular weight Mn=9.6×10$^2$. Based on the amounts of residual methoxy group and hydroxyl group which were estimated from the signal intensity ratios of $^{29}$Si-NMR, the organopolysiloxane was found to have the average compositional formula:

$$Ph_{0.7}(CH_3CH_2CH_2)_{0.3}Si(OX)_{0.22}O_{1.39}$$

wherein Ph=phenyl and X=H or CH$_3$ group.

Synthesis of siloxane solution #3

A 1-liter flask was charged with 316.8 g (1.6 mol) of phenyltrimethoxysilane, 59.2 g (0.4 mol) of vinyltrimethoxysilane, 225 g of toluene and 22 g of isopropyl alcohol. By following the same procedure as in Synthesis of siloxane solution #2, hydrolysis with the same amount of water and post-treatment were carried out, obtaining an organopolysiloxane-containing solution #3 in isopropanol (solids 30%).

On analysis, the organopolysiloxane had a number average molecular weight Mn=6.7×10$^2$. Based on the amounts of residual methoxy group and hydroxyl group which were estimated from the signal intensity ratios of $^{29}$Si-NMR, the organopolysiloxane was found to have the average compositional formula:

$$Ph_{0.8}(CH_2=CH)_{0.2}Si(OX)_{0.20}O_{1.40}$$

wherein Ph=phenyl and X=H or CH$_3$ group.

Synthesis of siloxane solution #4

For comparison purposes, an organopolysiloxane-containing solution was prepared using methyltrimethoxysilane. A 1-liter flask was charged with 272.0 g (2.0 mol) of methyltrimethoxysilane, 225 g of toluene and 22 g of isopropyl alcohol. By following the same procedure as in Synthesis of siloxane solution #2, hydrolysis with the same amount of water and post-treatment were carried out, obtaining an organopolysiloxane-containing solution #4 in isopropanol (solids 30%).

On analysis, the organopolysiloxane had a number average molecular weight Mn=9.4×10$^2$. Based on the amounts of residual methoxy group and hydroxyl group which were estimated from the signal intensity ratios of $^{29}$Si-NMR, the organopolysiloxane was found to have the average compositional formula:

$(CH_3)_{1.0}Si(OX)_{0.26}O_{1.37}$ wherein X=H or $CH_3$ group.

Synthesis of siloxane solution #5

A 1-liter flask was charged with 79.2 g (0.4 mol) of phenyltrimethoxysilane, 98.4 g (0.6 mol) of n-propyltrimethoxysilane, and 130.4 g of ethanol. While the contents were cooled at a temperature of lower than 10° C., 54.0 g (3.0 mol) of 0.05N dilute hydrochloric acid was added dropwise as a hydrolysis catalyst whereby the alkoxysilanes (phenyltrimethoxysilane and n-propyltrimethoxysilane) were hydrolyzed with water available from the dilute hydrochloric acid. After the completion of dropwise addition, the contents were stirred at room temperature for 12 hours, during which period hydrolysis was continued and the hydrolyzates were subject to partial dehydration polycondensation. There was obtained an organopolysiloxane-containing solution #5 (solids 30%).

On analysis, the organopolysiloxane had a number average molecular weight $Mn=9.6 \times 10^2$. Based on the amounts of residual alkoxy group and hydroxyl group which were estimated from the signal intensity ratios of $^{29}Si$-NMR, the organopolysiloxane was found to have the average compositional formula:

$Ph_{0.4}(CH_3CH_2CH_2)_{0.6}Si(OX)_{0.56}O_{1.22}$ wherein Ph=phenyl and X=H or $CH_3$ group.

Synthesis of siloxane solution #6

A 1-liter flask was charged with 158.4 g (0.8 mol) of phenyltrimethoxysilane, 29.6 g (0.2 mol) of vinyltrimethoxysilane, and 154.7 g of ethanol. While the contents were cooled at a temperature of lower than 10° C., 54.0 g (3.0 mol) of 0.05N dilute hydrochloric acid was added dropwise as a hydrolysis catalyst whereby the alkoxysilanes (phenyltrimethoxysilane and vinyltrimethoxysilane) were hydrolyzed with water available from the dilute hydrochloric acid. After the completion of dropwise addition, the contents were stirred at room temperature for 12 hours, during which period hydrolysis was continued and the hydrolyzates were subject to partial dehydration polycondensation. There was obtained an organopolysiloxane-containing solution #6 (solids 30%).

On analysis, the organopolysiloxane had a number average molecular weight $Mn=6.7 \times 10^2$. Based on the amounts of residual alkoxy group and hydroxyl group which were estimated from the signal intensity ratios of $^{29}Si$-NMR, the organopolysiloxane was found to have the average compositional formula:

$Ph_{0.8}(CH_2=CH)_{0.2}Si(OX)_{0.52}O_{1.24}$ wherein Ph=phenyl and X=H or $CH_3$ group.

Synthesis of siloxane solution #7

For comparison purposes, an organopolysiloxane-containing solution was prepared using methyltrimethoxysilane. A 1-liter flask was charged with 272.0 g (2.0 mol) of methyltrimethoxysilane and 247 g of toluene and further with 7.4 g of conc. sulfuric acid as a catalyst. While the contents were cooled at a temperature of lower than 30° C., 64.8 g (3.6 mol) of water was added dropwise whereby the methyltrimethoxysilane was hydrolyzed. After the completion of dropwise addition, the contents were stirred at room temperature for 1 hour, during which period hydrolysis was continued and the hydrolyzates were subject to partial dehydration polycondensation. By neutralizing the reaction solution with sodium bicarbonate, distilling off the formed methanol and solvent in vacuum, diluting the residue with toluene, washing with water, and distilling off the toluene, there was obtained an organopolysiloxane-containing solution #7 in isopropanol (solids 30%).

On analysis, the organopolysiloxane had a number average molecular weight $Mn=9.4 \times 10^2$. Based on the amounts of residual methoxy group and hydroxyl group which were estimated from the signal intensity ratios of $^{29}Si$-NMR, the organopolysiloxane was found to have the average compositional formula:

$(CH_3)_{1.0}Si(OX)_{0.26}O_{1.37}$ wherein X=H or $CH_3$ group.

Example 9

(Preparation of photocatalyzed coating compositions and Evaluation of water affinity-acquiring rate)

In organopolysiloxane-containing solutions #1 to #4 of Example 8, photocatalytic titania sol (TA-15 by Nissan Chemical K.K., solids 15%) and an organic solvent (ethanol) were blended in the proportion shown in Table 12. There were prepared photocatalyzed coating liquids #1 to #4 having a solid content of 3% (titania 1.5% and organopolysiloxane 1.5%).

TABLE 12

| | Composition (g) of coating liquids | | | |
|---|---|---|---|---|
| | Coating liquids | | | |
| | #1 | #2 | #3 | #4 |
| Solution #1 | 5 | — | — | — |
| Solution #2 | — | 5 | — | — |
| Solution #3 | — | — | 5 | — |
| Solution #4 | — | — | — | 5 |
| Titania sol | 10 | 10 | 10 | 10 |
| Ethanol | 85 | 85 | 85 | 85 |

Each of coating liquids #1 to #4 was applied to an aluminum plate of 0.3 mm thick by a flow coating technique and heated at a temperature of 150° C. for 20 minutes for curing the organopolysiloxane, obtaining samples #1 to #4 covered with a silicone coating of 0.2 to 1.0 µm in dry thickness.

Figure 5:
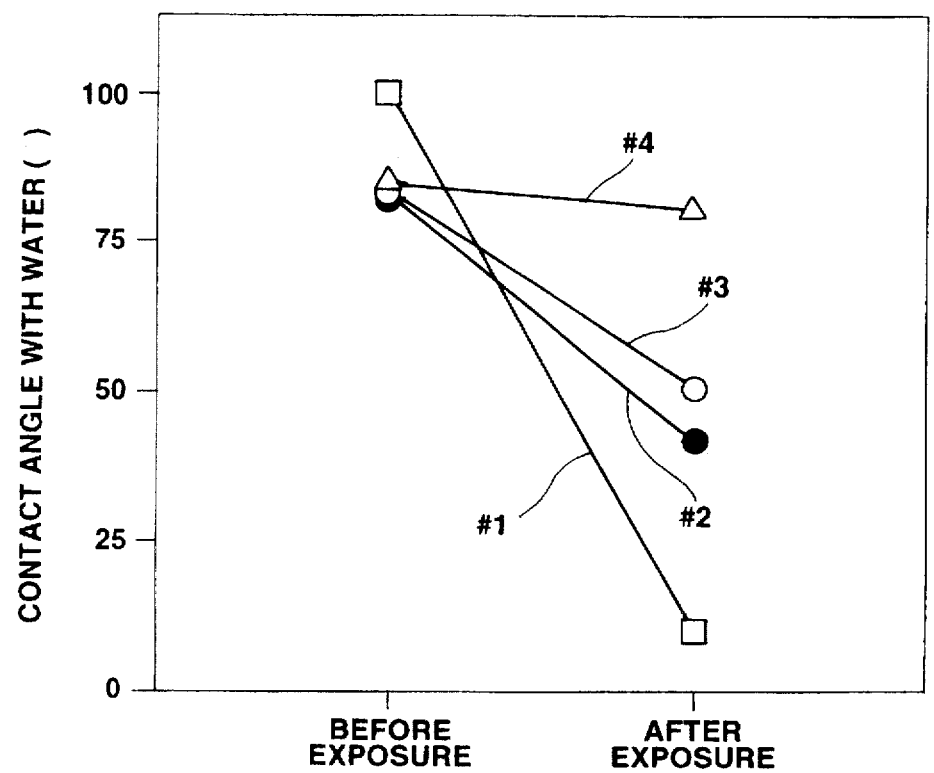
FIG. 5 is a graph showing contact angles before and after UV exposure of samples having different monomer compositions in Example 9.

Samples #1 to #4 were irradiated with UV radiation from a 2-kW metal halide lamp spaced a distance of 10 cm for 30 minutes. Before and after UV exposure, the contact angle with water at the surface was measured by means of a contact angle meter model CA-X150. The contact angle with water was plotted in the graph of FIG. 5 to show how the contact angle changed with the UV exposure time. As seen from the graph of FIG. 5, the silicone coatings which were formed from organopolysiloxane solutions #1 to #3 synthesized from silanes having a phenyl or n-propyl group acquired water affinity of the order of a contact angle with water of less than 60° after 30 minutes of UV exposure. In contrast, the silicone coating formed from organopolysiloxane solution #4 synthesized from methyltrimethoxysilane acquired little water affinity after 30 minutes of UV exposure.

This suggests that in replacing organic groups attached to silicon atoms of silicone at the surface of a silicone coating by hydroxyl groups under the impetus of photocatalysis, organic groups of 3 or more carbon atoms are more easily replaced than an organic group of one carbon atom so that coatings having organic groups of 3 or more carbon atoms are rendered hydrophilic within a shorter time or with a less dose of light.

Example 10
(Preparation of photocatalyzed coating compositions and Evaluation of water affinity-acquiring rate)

In organopolysiloxane-containing solutions #1, #5, #6 and #7 of Example 8, photocatalytic titania sol (TA-15 by Nissan Chemical K.K.), silica sol dispersed in methanol (solids 15%), and an organic solvent (a 7/3 mixture of ethanol and propylene glycol monomethyl ether) were blended in the proportion shown in Table 13. There were prepared photocatalyzed coating liquids #1 to #4 having a solid content of 3% (titania 1.5% and organopolysiloxane 1.5%).

TABLE 13

| Composition (g) of coating liquids | | | | |
|---|---|---|---|---|
| | Coating liquids | | | |
| | #1 | #2 | #3 | #4 |
| Solution #1 | 15 | — | — | — |
| Solution #5 | — | 15 | — | — |
| Solution #6 | — | — | 15 | — |
| Solution #7 | — | — | — | 15 |
| Silica sol | 10 | 10 | 10 | 10 |
| Titania sol | 40 | 40 | 40 | 40 |
| Organic solvent | 335 | 335 | 335 | 335 |

Each of coating liquids #1 to #4 was applied to an aluminum plate of 0.3 mm thick by a flow coating technique and heated at a temperature of 150° C. for 20 minutes for hot-curing the organopolysiloxane, obtaining samples covered with a silicone coating of 0.2 to 0.5 µm in dry thickness.

These samples were irradiated with UV radiation from a 20-W BLB fluorescent lamp spaced a distance of 10 cm for 5 days. Before and after UV exposure, the contact angle with water at the surface was measured by means of a contact angle meter model CA-X150. A change of contact angle with water before and after UV exposure is shown in Table 14.

TABLE 14

| Change of contact angle with water | | | | | |
|---|---|---|---|---|---|
| | | Coating liquid | | | |
| | | #1 | #2 | #3 | #4 |
| Contact angle (°) | Before exposure | 99 | 83 | 82 | 84 |
| | After exposure | 9 | 23 | 31 | 58 |

As seen from Table 14, despite identical UV exposure conditions, the silicone coating which was formed from the coating liquid of organopolysiloxane solution #7 synthesized from methyltrimethoxysilane could not acquire water affinity as did the silicone coatings which were formed from the coating liquids of organopolysiloxane solutions #1, #5 and #6 synthesized from silanes having a phenyl or n-propyl group.

Example 11
(Coating composition containing monomer and photocatalyst)

This example demonstrates the commercial applicability of coating liquids containing a silane and a photocatalyst. Coating liquids containing various silanes and a photocatalyst were prepared.

Coating liquid #1

A 200-ml flask was charged with 10 g of silica sol dispersed in water (solids 15%) and 40 g of titania sol (TA-15 by Nissan Chemical K.K., solids 15%), which were stirred at room temperature for 1 hour. After 340.9 g of ethanol was added, 9.13 g of methyltrimethoxysilane was added dropwise. While stirring for 2 hours, the methyltrimethoxysilane was hydrolyzed with water available in the system and the hydrolyzate was subject to partial dehydration polycondensation. There was obtained coating liquid #1 containing the photocatalyst and organopolysiloxane (solids 3.1%).

Coating liquid #2

A 200-ml flask was charged with 10 g of silica sol dispersed in water (solids 15%) and 40 g of titania sol (TA-15), which were stirred at room temperature for 1 hour. After 343.0 g of ethanol was added, 2.19 g of dimethyldimethoxysilane and 4.83 g of phenyltrimethoxysilane were added dropwise. While stirring for 2 hours, the alkoxysilanes were hydrolyzed with water available in the system and the hydrolyzates were subject to partial dehydration polycondensation. There was obtained coating liquid #2 containing the photocatalyst and organopolysiloxane (solids 3.2%).

Coating liquid #3

A 200-ml flask was charged with 10 g of silica sol dispersed in water (solids 15%) and 40 g of titania sol (TA-15), which were stirred at room temperature for 1 hour. After 341.7 g of ethanol was added, 6.4 g of methyltrimethoxysilane and 1.19 g of γ-glycidoxypropyltrimethoxysilane were added dropwise. While stirring for 2 hours, the alkoxysilanes were hydrolyzed with water available in the system and the hydrolyzates were subject to partial dehydration polycondensation. There was obtained coating liquid #3 containing the photocatalyst and organopolysiloxane (solids 3.1%).

Coating liquid #4

A 200-ml flask was charged with 10 g of silica sol dispersed in water (solids 15%) and 40 g of titania sol (TA-15), which were stirred at room temperature for 1 hour. After 340.0 g of ethanol was added, 5.44 g of n-propyltrimethoxysilane and 4.68 g of tetraethoxysilane were added dropwise. While stirring for 2 hours, the alkoxysilanes were hydrolyzed with water available in the system and the hydrolyzates were subject to partial dehydration polycondensation. There was obtained coating liquid #4 containing the photocatalyst and organopolysiloxane (solids 3.3%).

Coating liquid #5

A 200-ml flask was charged with 10 g of silica sol dispersed in water (solids 15%) and 40 g of titania sol (TA-15), which were stirred at room temperature for 1 hour. After 342.9 g of ethanol was added, 7.08 g of methyltrimethoxysilane oligomer (trimer on the average) was added dropwise. While stirring for 2 hours, the methyltrimethoxysilane oligomer was hydrolyzed with water available in the system and the hydrolyzate was subject to partial dehydration polycondensation. There was obtained coating liquid #5 containing the photocatalyst and organopolysiloxane (solids 3.1%).

Coating liquids #6 to #10

For comparison purposes, by following the procedure of coating liquids #1 to #5 except that photocatalytic titania sol was omitted and 50 g of silica sol dispersed in water (solids 15%) was added, there were prepared coating liquids #6 to #10 which corresponded to coating liquids #1 to #5, but did not contain the photocatalyst.

Each of coating liquids #1 to #10 was applied to an aluminum plate of 0.3 mm thick by a flow coating technique and heated at a temperature of 170° C. for 15 minutes for curing the organopolysiloxane, obtaining samples covered with a silicone coating of 0.2 to 0.5 μm in dry thickness, some of which contained the photocatalyst and the remainder did not.

These samples were irradiated with UV radiation from a 20-W BLB fluorescent lamp spaced a distance of 10 cm at a UV illuminance of 0.6 mW/cm² for 10 days. Before and after UV exposure, the contact angle with water at the surface was measured by means of a contact angle meter model CA-X150. A change of contact angle with water before and after UV exposure is shown in Table 15.

TABLE 15

| Coating liquid | Change of contact angle with water | | | | | | | | | |
|---|---|---|---|---|---|---|---|---|---|---|
| | #1 | #2 | #3 | #4 | #5 | #6 | #7 | #8 | #9 | #10 |
| Contact angle (°) | | | | | | | | | | |
| Before exposure | 76 | 91 | 67 | 88 | 78 | 81 | 98 | 69 | 91 | 77 |
| After exposure | 3 | 15 | 5 | 4 | 10 | 80 | 91 | 60 | 88 | 75 |

As seen from Table 15, the silicone coatings which were formed from photocatalyzed coating liquids #1 to #5 acquired a high degree of water affinity whereas the silicone coatings which were formed from photocatalyst-free coating liquids #6 to #10 acquired little water affinity.

Although some preferred embodiments have been described, many modifications and variations may be made thereto in the light of the above teachings. It is therefore to be understood that within the scope of the appended claims, the invention may be practiced otherwise than as specifically described.

We claim:

1. A photocatalytic hydrophilic coating composition comprising
   (A) a coat-forming element comprising an organopolysiloxane of the average compositional formula:

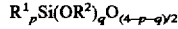

$$R^1_p Si(OR^2)_q O_{(4-p-q)/2}$$

wherein $R^1$ is independently a hydrogen atom or a monovalent organic group having 1 to 18 carbon atoms, $R^2$ is independently a hydrogen atom or a monovalent organic group having 1 to 4 carbon atoms, and letters p and q are numbers in the range: $0.7 \leq p \leq 1.6$, $0 < q < 3.3$, and $0.7 < p+q < 4$, said coat-forming element capable of the forming a coating of silicone resin when cured, and
   (B) a particulate photocatalyst dispersed in said coat-forming element which exerts photocatalysis upon photo excitation such that at least some of organic groups attached to silicon atoms of silicone molecules at the surface of said coating are replaced by hydroxyl groups in the presence of water, thereby rendering the coating surface hydrophilic.

2. The photocatalytic hydrophilic coating composition of claim 1 wherein $R^1$ contains at least one organic group having 3 to 18 carbon atoms.

3. The composition of claim 2, wherein p is from 0.1 to 1.0.

4. The photocatalytic hydrophilic coating composition of claim 1 wherein said organopolysiloxane is obtained by at least partially hydrolyzing a mixture consisting essentially of
   (a) 0 to 60 mol % of a silane of the general formula: $R^1_2SiX_2$ wherein $R^1$ is as defined above and X is chlorine, bromine or an alkoxy group having 1 to 4 carbon atoms,
   (b) 10 to 100 mol % of a silane of the general formula: $R^1SiX_3$ wherein $R^1$ and X are as defined above, and
   (c) 0 to 30 mol % of a silane of the general formula: $SiX_4$ wherein X is as defined above, followed by polycondensation.

5. The composition of claim 4, wherein the silane (a) is contained in an amount of 1 to 40 mol %, silane (b) is contained in an amount of 30 to 80 mol % and silane (c) is contained in an amount of 0 to 20 mol %.

6. The photocatalytic hydrophilic coating composition of claim 1 which contains 100 parts by weight of the coat-forming element and 10 to 400 parts by weight of the particulate photocatalyst.

7. The photocatalytic hydrophilic coating composition of claim 1 wherein the particulate photocatalyst comprises crystalline titania.

8. The composition of claim 7, wherein the titania has a mean particle size of 0.1 μm or less.

9. The photocatalytic hydrophilic coating composition of claim 1 further comprising (C) a metal selected from the group consisting of silver, copper, gold, platinum, palladium, iron, nickel, and zinc or a compound thereof.

10. The photocatalytic hydrophilic coating composition of claim 9 which contains less than 20 parts of the metal or compound thereof per 100 parts by weight of the photocatalyst.

11. The composition of claim 1, wherein in the organopolysiloxane,
   the $R^1$ groups are independently hydrogen or an alkyl, cycloalkyl, alkenyl, aryl or aralkyl group optionally substituted by halogen atoms, epoxy-containing groups, (meth)acryloxy groups, amino groups or mercapto groups, and
   the $R^2$ groups are independently hydrogen or an alkyl group.

12. The composition of claim 1, wherein the photocatalyst exerts photocatalysis by photo excitation from sunlight.

13. The composition of claim 1, wherein the particulate photocatalyst is titanium dioxide, tin oxide, zinc oxide, ferric oxide, tungsten trioxide, dibismuth trioxide or strontium titanate.

14. A photocatalytic hydrophilic coating composition comprising
   (a) 0 to 60 mol % of a silane of the general formula: $R^1_2SiX_2$ wherein $R^1$ is independently a hydrogen atom or a monovalent organic group having 1 to 18 carbon atoms and X is chlorine, bromine or an alkoxy group having 1 to 4 carbon atoms,
   (b) 10 to 100 mol % of a silane of the general formula: $R^1SiX_3$ wherein $R^1$ and X are as defined above,
   (c) 0 to 30 mol % of a silane of the general formula: $SiX_4$ wherein X is as defined above, and
   (d) a particulate photocatalyst, wherein said composition, when applied to a substrate, forms a coating of silicone resin through hydrolysis of the silanes in the presence of water and dehydrating polycondensation, and
   said photocatalyst exerts photocatalysis upon photo excitation such that at least some of the organic groups attached to silicon atoms of silicone molecules at the surface of said coating are replaced by hydroxyl groups in the presence of water, thereby rendering the coating surface hydrophilic.

15. The composition of claim 14, wherein the $R^1$ groups are independently hydrogen or an alkyl, cycloalkyl, alkenyl, aryl or aralkyl group optionally substituted by halogen atoms, epoxy-containing groups, (meth)acryloxy groups, amino groups or mercapto groups.

16. A photocatalytic hydrophilic coating composition of the two part type comprising (A) a first liquid part having dispersed in a dispersing medium an organopolysiloxane of the average compositional formula:

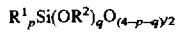

wherein $R^1$ is independently a hydrogen atom or a monovalent organic group having 1 to 18 carbon atoms, $R^2$ is independently a hydrogen atom or a monovalent organic group having 1 to 4 carbon atoms, and letters p and q are numbers in the range: $0.7 \leq p \leq 1.6$, $0<q<3.3$, and $0.7<p+q<4$, said first liquid part capable of forming a coating of silicone resin when cured in the presence of water, and (B) a second liquid part having dispersed in an aqueous dispersing medium a particulate photocatalyst which exerts photocatalysis upon photo excitation such that at least some of the organic groups attached to silicon atoms of silicone molecules at the surface of said coating are replaced by hydroxyl groups in the presence of water, thereby rendering the coating surface hydrophilic.

17. The composition of claim 16, wherein in the organopolysiloxane, the $R^1$ groups are independently hydrogen or an alkyl, cycloalkyl, alkenyl, aryl or aralkyl group optionally substituted by halogen atoms, epoxy-containing groups, (meth)acryloxy groups, amino groups or mercapto groups, and the $R^2$ groups are independently hydrogen or an alkyl group.

18. A photocatalytic hydrophilic coating composition of the two part type comprising (A) a first liquid part having dispersed in a non-aqueous dispersing medium (a) 0 to 60 mol % of a silane of the general formula: $R^1_2SiX_2$ wherein $R^1$ is independently a hydrogen atom or a monovalent organic group having 1 to 18 carbon atoms and X is chlorine, bromine or an alkoxy group having 1 to 4 carbon atoms, (b) 10 to 100 mol % of a silane of the general formula: $R^1SiX_3$ wherein $R^1$ and X are as defined above, and (c) 0 to 30 mol % of a silane of the general formula: $SiX_4$ wherein X is as defined above, said first liquid part capable of forming a coating of silicone resin when cured in the presence of water, and (B) a second liquid part having dispersed in an aqueous dispersing medium a particulate photocatalyst which exerts photocatalysis upon photo excitation such that at least some of the organic groups attached to silicon atoms of silicone molecules at the surface of said coating are replaced by hydroxyl groups in the presence of water, thereby rendering the coating surface hydrophilic.

19. The composition of claim 18, wherein the $R^1$ groups are independently hydrogen or an alkyl, cycloalkyl, alkenyl, aryl or aralkyl group optionally substituted by halogen atoms, epoxy-containing groups, (meth)acryloxy groups, amino groups or mercapto groups.

* * * * *